US011150025B2

(12) United States Patent
Miller et al.

(10) Patent No.: US 11,150,025 B2
(45) Date of Patent: Oct. 19, 2021

(54) HEAT EXCHANGERS FOR MULTI-AXIS GIMBAL POINTING OR TARGETING SYSTEMS

(71) Applicant: Raytheon Company, Waltham, MA (US)

(72) Inventors: Kirk A. Miller, Dallas, TX (US); Gary J. Schwartz, Dallas, TX (US); Aaron M. Dossman, Van Alstyne, TX (US); Mark A. Michnevitz, Frisco, TX (US)

(73) Assignee: Raytheon Company, Waltham, MA (US)

( * ) Notice: Subject to any disclaimer, the term of this patent is extended or adjusted under 35 U.S.C. 154(b) by 234 days.

(21) Appl. No.: 15/976,672

(22) Filed: May 10, 2018

(65) Prior Publication Data

US 2019/0346209 A1    Nov. 14, 2019

(51) Int. Cl.
*F28D 1/053* (2006.01)
*F16M 11/12* (2006.01)
(Continued)

(52) U.S. Cl.
CPC ....... *F28D 1/05333* (2013.01); *F16M 11/126* (2013.01); *F28F 9/0131* (2013.01);
(Continued)

(58) Field of Classification Search
CPC ........... F28D 2001/0273; F28D 9/0012; F28D 9/0018; F28D 7/005; F28D 7/1669; F28D 7/163; F16M 11/123; F16M 11/125; F16M 11/126; F16M 11/128; H05K 7/20245; H05K 7/20263; H05K 7/20409;
(Continued)

(56) References Cited

U.S. PATENT DOCUMENTS 1,368,197 A * 2/1921 Radloff ..................... F28F 1/12
 165/151
1,937,343 A * 11/1933 Higgins .................... F28F 1/12
 165/133
(Continued)

FOREIGN PATENT DOCUMENTS

WO    2006/065892 A2    6/2006

OTHER PUBLICATIONS

International Search Report dated May 9, 2019 in connection with International Patent Application No. PCT/US2019/016327, 3 pages.
(Continued)

*Primary Examiner* — Joel M Attey
*Assistant Examiner* — For K Ling

(57) ABSTRACT

An apparatus includes a heat exchanger configured to be positioned around and coupled to a multi-axis gimbal. The heat exchanger includes an inlet configured to receive fluid containing heat generated by an equipment package carried by the gimbal. The heat exchanger also includes multiple heat rejection interfaces configured to reject the heat from the fluid into surrounding air in order to cool the fluid. The heat exchanger further includes an outlet configured to provide the cooled fluid from the heat exchanger. The heat rejection interfaces of the heat exchanger extend around the heat exchanger and are configured to reject the heat from the fluid regardless of a direction in which the gimbal is pointing the equipment package.

21 Claims, 17 Drawing Sheets

(51) Int. Cl.
*F28F 9/013* (2006.01)
*F28D 1/02* (2006.01)
*F28D 21/00* (2006.01)
*B64D 47/08* (2006.01)
*F16M 13/02* (2006.01)
*B64C 39/02* (2006.01)

(52) U.S. Cl.
CPC ...... *B64C 39/024* (2013.01); *B64C 2201/127* (2013.01); *B64D 47/08* (2013.01); *F16M 13/02* (2013.01); *F28D 2001/0273* (2013.01); *F28D 2021/0021* (2013.01); *F28D 2021/0029* (2013.01); *F28F 2225/04* (2013.01)

(58) Field of Classification Search
CPC ........... H05K 7/20418; H05K 7/20272; H05K 7/20218; H05K 7/20927; F28F 1/12
See application file for complete search history.

(56) References Cited

U.S. PATENT DOCUMENTS

| | | | |
|---|---|---|---|
| 2,434,752 A | 1/1948 | Waller | |
| 3,771,595 A * | 11/1973 | Slaasted | F28F 1/02 165/151 |
| 4,641,706 A | 2/1987 | Haynie | |
| 5,097,899 A * | 3/1992 | Martin | B21D 53/04 165/169 |
| 6,128,832 A | 10/2000 | Stueble | |
| 6,544,085 B1 | 4/2003 | Menard et al. | |
| 6,557,626 B1 | 5/2003 | O'Sullivan et al. | |
| 6,644,393 B2 | 11/2003 | Roberts et al. | |
| 7,159,645 B1 * | 1/2007 | Go | F16M 11/123 165/104.34 |
| 7,403,392 B2 * | 7/2008 | Attlesey | G06F 1/20 361/699 |
| 7,699,691 B1 * | 4/2010 | Voigt | H05K 7/20154 165/104.33 |
| 8,117,930 B2 * | 2/2012 | Adams | F16C 37/007 74/5.95 |
| 8,132,408 B2 * | 3/2012 | Li | F02B 29/0462 60/612 |
| 8,341,965 B2 | 1/2013 | Price et al. | |
| 8,601,791 B2 | 12/2013 | Bajusz et al. | |
| 8,636,051 B2 | 1/2014 | Weber et al. | |
| 9,874,579 B1 * | 1/2018 | Butscher | G01C 21/16 |
| 2001/0033813 A1 | 10/2001 | Filho et al. | |
| 2009/0193804 A1 | 8/2009 | Ohno et al. | |
| 2011/0205703 A1 * | 8/2011 | Weaver | G03B 15/006 361/695 |
| 2013/0000881 A1 * | 1/2013 | Lavoie | H05K 7/20409 165/185 |
| 2013/0032314 A1 * | 2/2013 | Baerd | E21B 41/0007 165/104.33 |
| 2017/0028809 A1 | 2/2017 | Duinat et al. | |
| 2017/0131621 A1 * | 5/2017 | Tang | G03B 17/02 |

OTHER PUBLICATIONS

Written Opinion of the International Searching Authority dated May 9, 2019 in connection with International Patent Application No. PCT/US2019/016327, 4 pages.

Mezzo Technologies, "Mezzo Technologies / Why Microtubes?"; accessed at https://mezzotech.com/why-micro-tubes/ on May 4, 2018; 8 pages.

Raytheon Company; "Raytheon to start production of first multi-spectral targeting system with next-generation accuracy"; CISION PR Newswire; Apr. 29, 2016; 3 pages.

* cited by examiner

HEAT EXCHANGERS FOR MULTI-AXIS GIMBAL POINTING OR TARGETING SYSTEMS

GOVERNMENT RIGHTS

This invention was made with U.S. government support under a confidential government contract (contract number withheld) awarded by the U.S. government. The U.S. government has certain rights in the invention.

TECHNICAL FIELD

This disclosure generally relates to cooling systems. More specifically, this disclosure relates to heat exchangers for multi-axis gimbal pointing or targeting systems.

BACKGROUND

Flight vehicles such as airplanes and drones often use multi-axis gimbals to point cameras or other equipment packages in multiple directions relative to the vehicles. For example, some gimbals can rotate equipment packages 360° around a vertical axis and 160° around a horizontal axis in order to point the equipment packages in virtually any direction downward from a vehicle. In some equipment packages, large amounts of waste heat from highly-concentrated electronic and power sources may need to be removed from the equipment packages.

Various internal approaches have been developed to cool equipment packages on flight vehicles. For example, one or more onboard fans can draw external air into an equipment package and force the air over heat-generating components or over an air-to-liquid radiator. However, a fan's ability to pull external air into an equipment package varies based on the pointing angle of the equipment package, and airflow stagnation can occur at multiple pointing angles. Also, the cross-section of the air-to-liquid radiator is often limited by the geometry of the equipment package. Alternatively, heat-generating components can be attached directly to the external skin of an equipment package, or heat pipes can transfer heat from the heat-generating components to the external skin of the equipment package. However, geometry options can be limited with these approaches, and the heat-rejection capacity can vary significantly over the range of pointing angles. Also, temperature limitations exist on fluid in the heat pipes, which can also limit the heat-rejection capacity.

Various external approaches have also been developed to cool equipment packages on flight vehicles. For example, an external air blower and ducting can be used to pump cooling air across heat-generating components in an equipment package. However, cooling capacity can still be affected by the pointing angle, and this approach requires a gimbal to support an external connection for the cooling air. As another example, ram air can be used across an external air-to-liquid radiator, and cooling fluid can be pumped through rotating joints of a gimbal to transfer heat from an equipment package to the radiator. However, this approach requires the gimbal to support external connections for power, control, and cooling lines.

SUMMARY

This disclosure provides heat exchangers for multi-axis gimbal pointing or targeting systems.

In a first embodiment, an apparatus includes a heat exchanger configured to be positioned around and coupled to a multi-axis gimbal. The heat exchanger includes an inlet configured to receive fluid containing heat generated by an equipment package carried by the gimbal. The heat exchanger also includes multiple heat rejection interfaces configured to reject the heat from the fluid into surrounding air in order to cool the fluid. The heat exchanger further includes an outlet configured to provide the cooled fluid from the heat exchanger. The heat rejection interfaces of the heat exchanger extend around the heat exchanger and are configured to reject the heat from the fluid regardless of a direction in which the gimbal is pointing the equipment package.

In a second embodiment, a system includes a multi-axis gimbal configured to rotate an equipment package about an azimuth axis and about an elevation axis. The gimbal includes a base, an azimuth yoke, and elevation covers. The system also includes a heat exchanger positioned around and coupled to the azimuth yoke or elevation covers of the gimbal. The heat exchanger includes an inlet configured to receive fluid containing heat generated by the equipment package. The heat exchanger also includes multiple heat rejection interfaces configured to reject the heat from the fluid into surrounding air in order to cool the fluid. The heat exchanger further includes an outlet configured to provide the cooled fluid from the heat exchanger. The heat rejection interfaces of the heat exchanger extend around the heat exchanger and are configured to reject the heat from the fluid regardless of a direction in which the gimbal is pointing the equipment package.

In a third embodiment, a method includes positioning a heat exchanger around and coupling the heat exchanger to a multi-axis gimbal. The method also includes coupling an inlet of the heat exchanger to receive fluid containing heat generated by an equipment package carried by the gimbal. The method further includes coupling an outlet of the heat exchanger to provide the fluid from the heat exchanger. The heat exchanger includes multiple heat rejection interfaces configured to reject the heat from the fluid into surrounding air in order to cool the fluid. The heat rejection interfaces of the heat exchanger extend around the heat exchanger and are configured to reject the heat from the fluid regardless of a direction in which the gimbal is pointing the equipment package.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
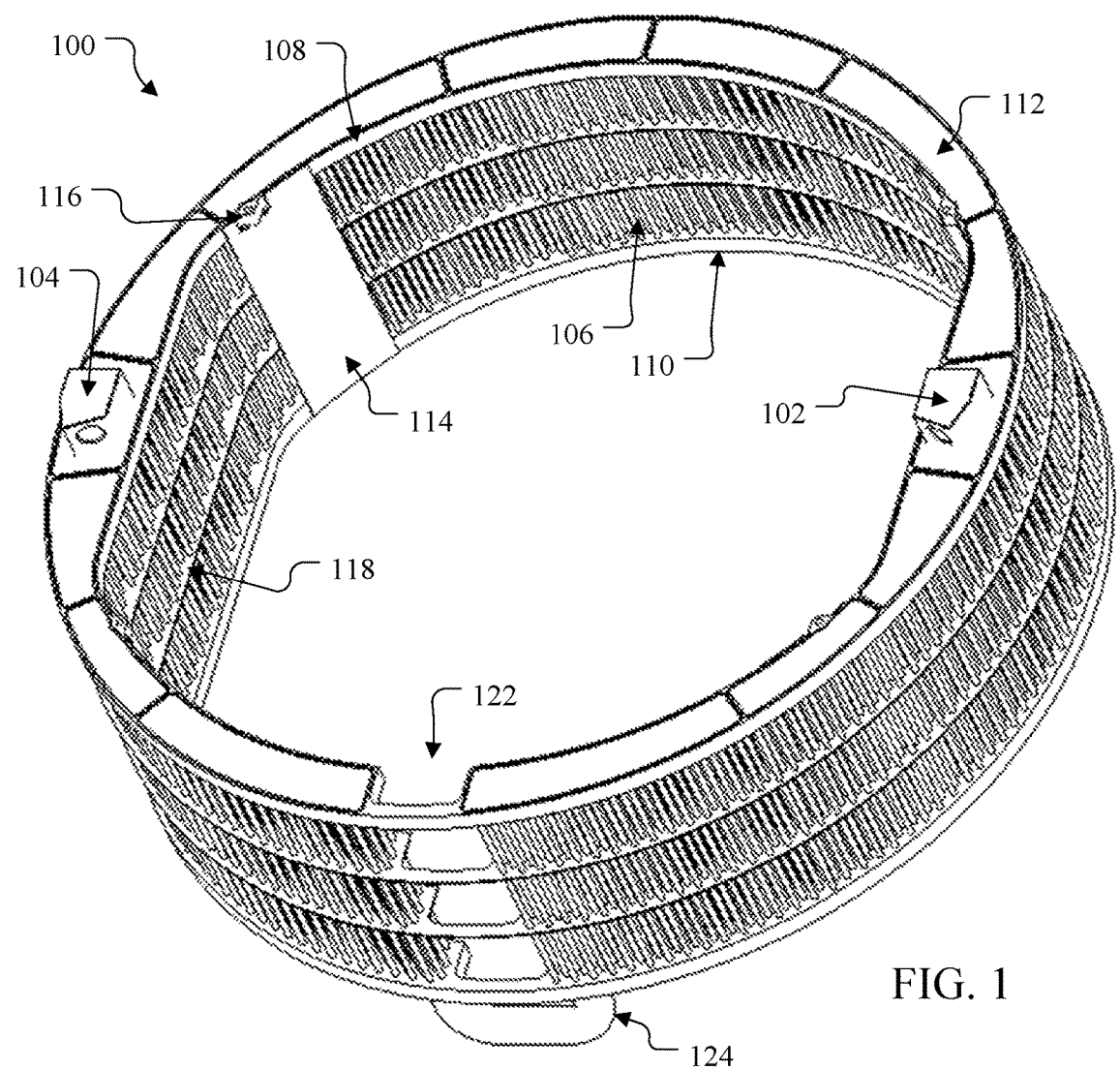
FIGS. 1 through 5 illustrate a first example heat exchanger for a multi-axis gimbal pointing or targeting system in accordance with this disclosure.

FIGS. 1 through 20, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, vehicles such as airplanes and drones often use multi-axis gimbals in order to point equipment packages in multiple directions relative to the vehicles. In various equipment packages, large amounts of waste heat from highly-concentrated electronic and power sources may need to be removed from the equipment packages. Unfortunately, some approaches for removing waste heat from equipment packages can suffer from various disadvantages. For example, some approaches are direction-dependent, meaning the amount of waste heat that can be removed from an equipment package varies based on the pointing angle of the equipment package relative to a vehicle's path. Also, some approaches require that a gimbal support one or more external connections for cooling, which increases the cost and complexity of an overall system and creates additional possible failure points in the overall system.

This disclosure provides various heat exchangers that can be coupled to or used with multi-axis gimbal pointing or targeting systems. As described in more detail below, fluid is transported from equipment packages to the heat exchangers and then back to the equipment packages in order to remove heat from the equipment packages. The heat is rejected from the heat exchangers into the surrounding air through convection. The heat exchangers can include large exposed surface areas that allow large amounts of waste heat to be removed from the equipment packages. Also, the heat exchangers can be positioned on the pointing or targeting systems and designed so that they accomplish this function effectively regardless of the pointing angle of the equipment packages. Moreover, the heat exchangers can accomplish this function without requiring gimbals that support external connections used for cooling.

In some embodiments, each of the heat exchangers can be used with a pointing or targeting system that includes a gimbal supporting rotation of an equipment package about two axes, such as a vertical azimuth axis and a horizontal elevation axis. In these embodiments, each heat exchanger can be placed around a gimbal so that the heat exchanger encircles the vertical azimuth axis. Rotation of an equipment package about the vertical azimuth axis causes the heat exchanger to rotate, while rotation of the equipment package solely about the elevation axis causes the heat exchanger to remain in the same position. The design of each heat exchanger allows effective heat rejection regardless of rotation about the azimuth axis, and rotation about the elevation axis does not change each heat exchanger's position.

In this way, the heat exchangers support simpler and more effective cooling for components within equipment packages of multi-axis gimbal pointing or targeting systems. Also, the heat exchangers can be used with self-contained equipment packages, such as line replaceable units (LRAs) or weapon replaceable assemblies (WRAs). This means that a cooling system for an equipment package can be contained entirely within that equipment package. This facilitates easier installation and replacement of the equipment packages and allows more reliable operation of the equipment packages. Further, since the heat exchangers are positioned outside the equipment packages, the heat exchangers can support a much larger number of geometries and are not as limited. Moreover, the heat exchangers can be used with gimbals that do not require external connections for cooling, which can simplify the overall system and remove possible failure points in the system. In addition, the heat exchangers can help to minimize the size, weight, and power requirements of the pointing or targeting systems while reducing impacts to flight operations or other operations (such as by providing low aerodynamic drag).

Figure 2:
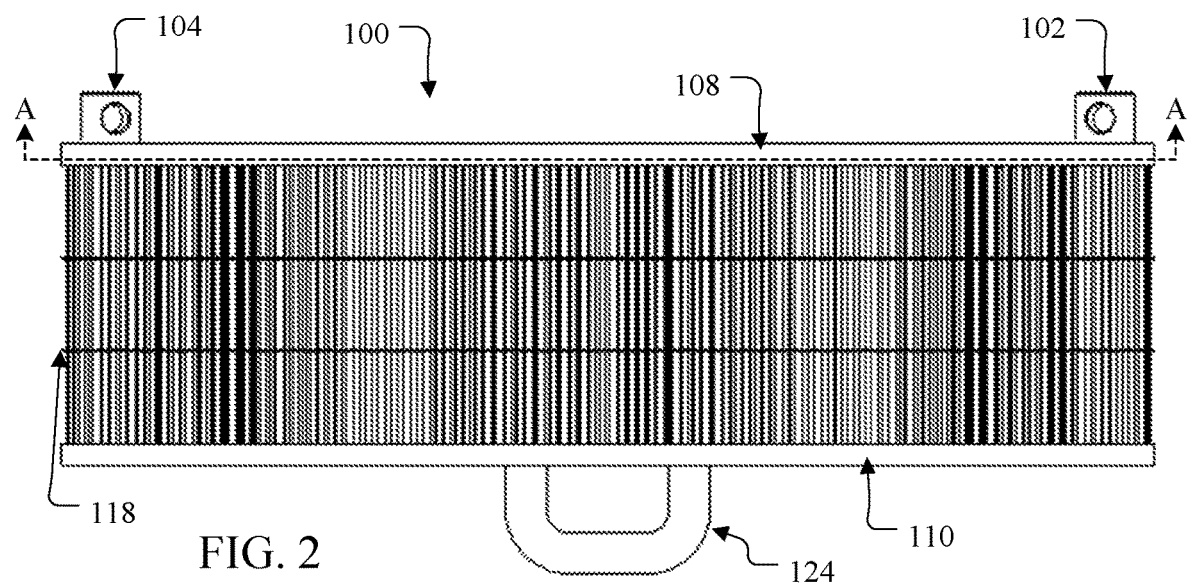
Figure 3:
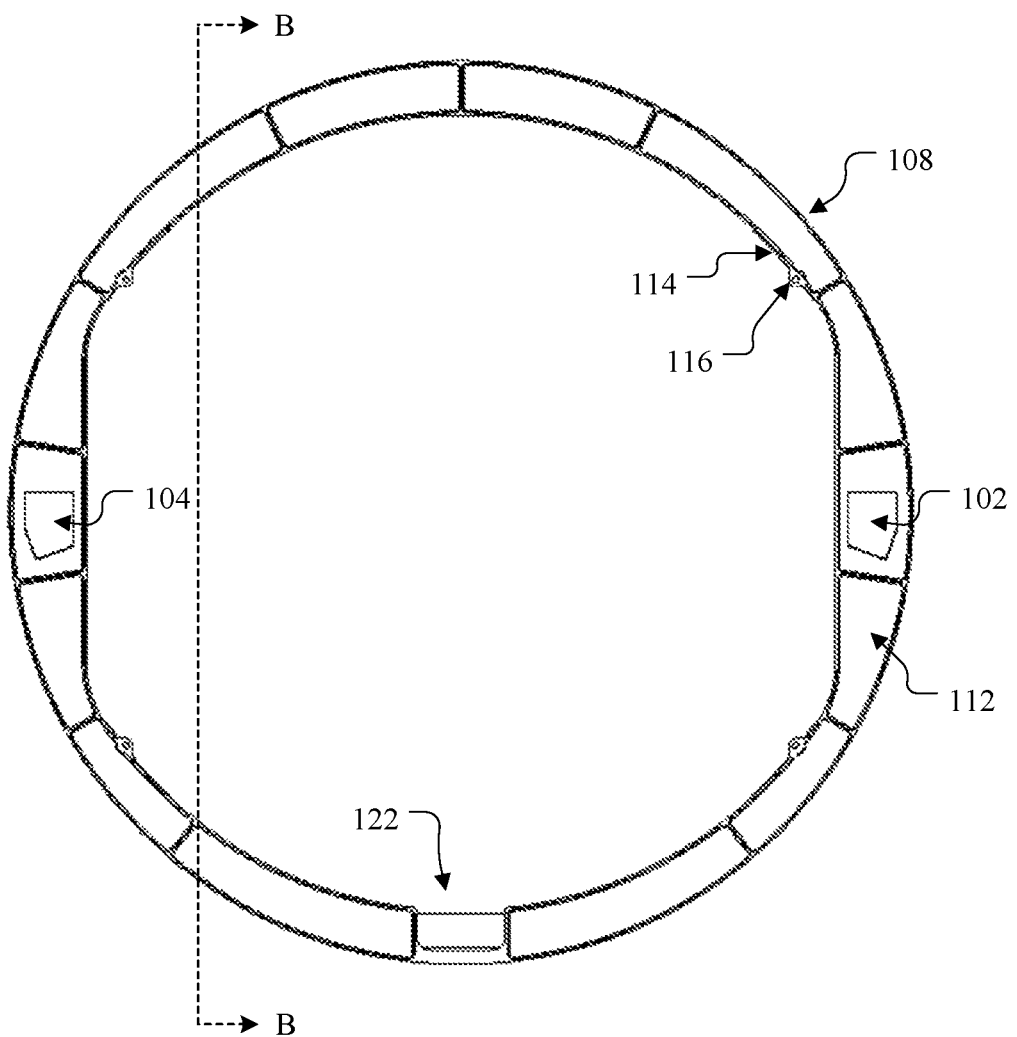
Figure 4:
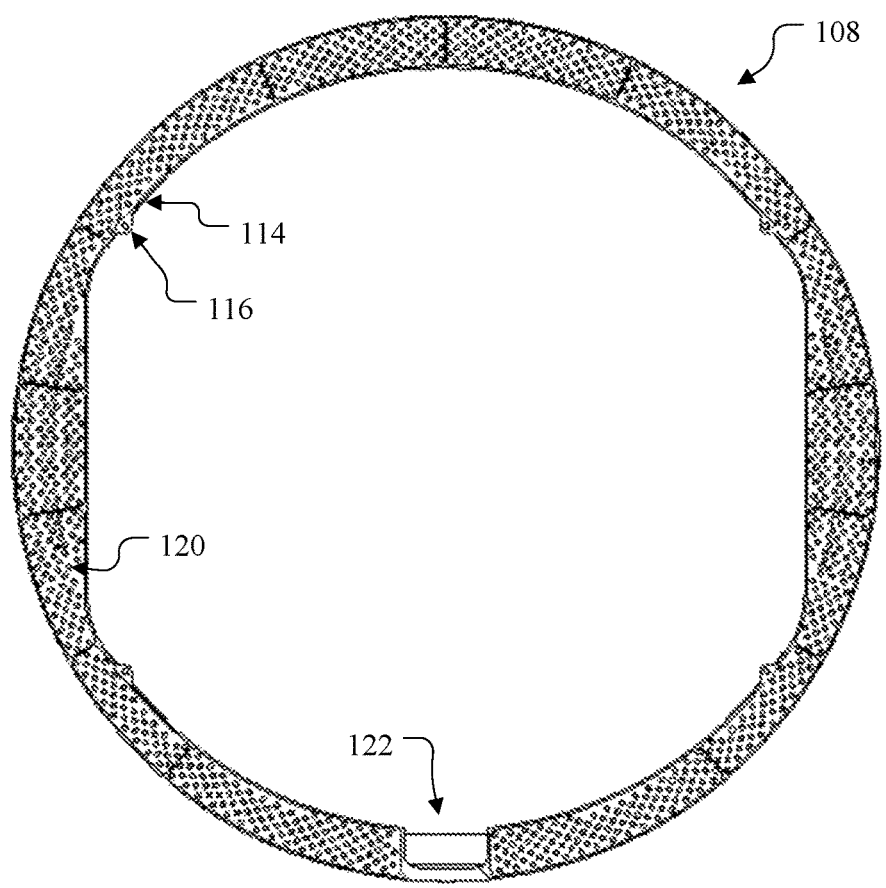
Figure 5:
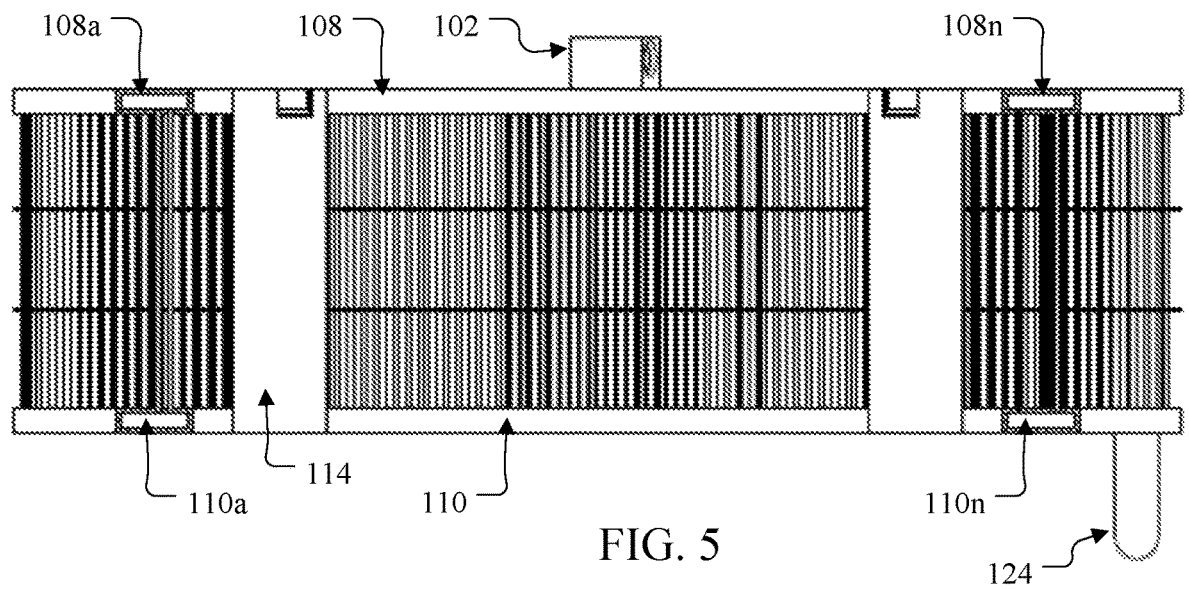
Figure 6:
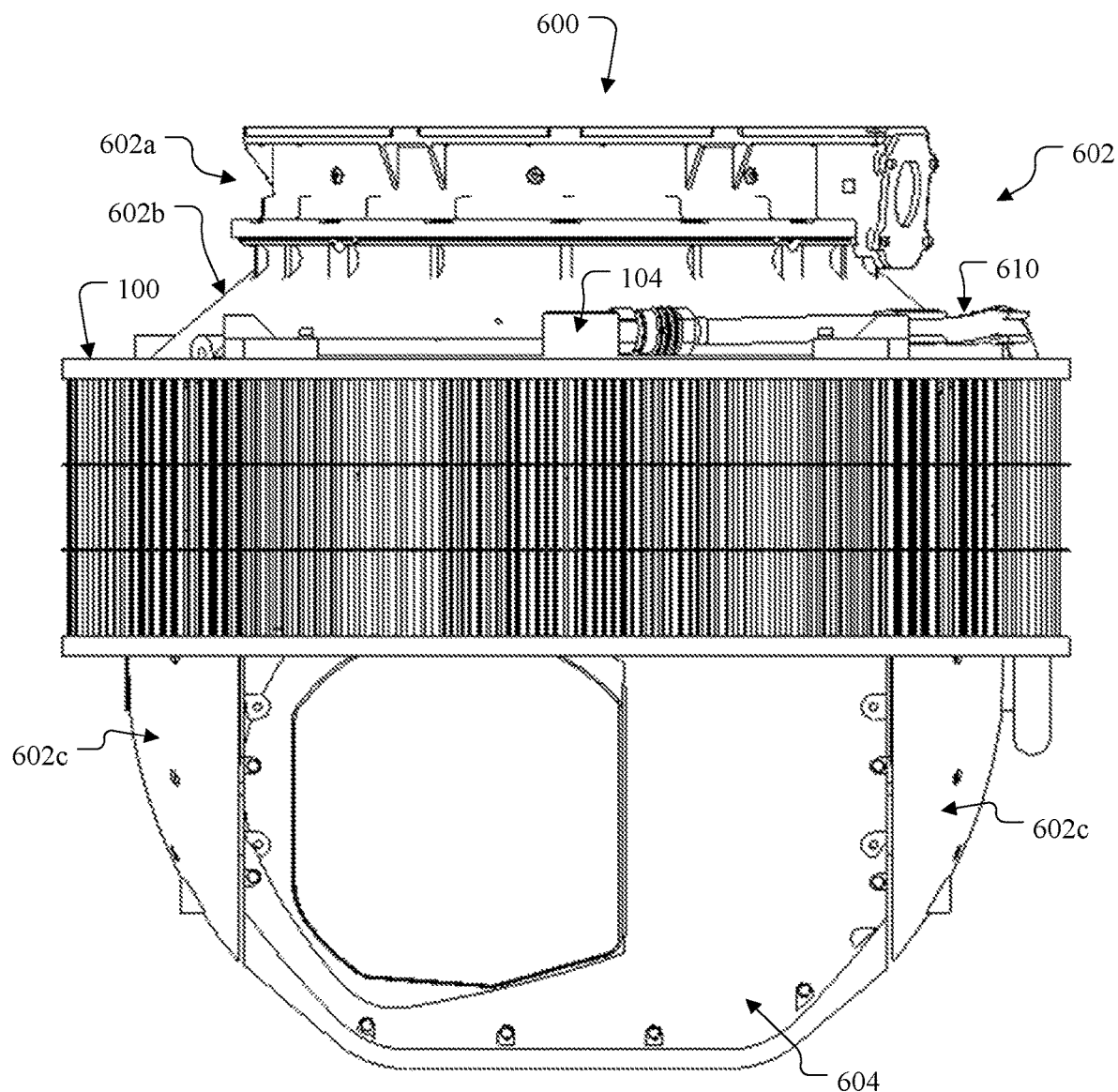
FIGS. 6 through 9 illustrate an example multi-axis gimbal pointing or targeting system that uses the first example heat exchanger in accordance with this disclosure.
Figure 7:
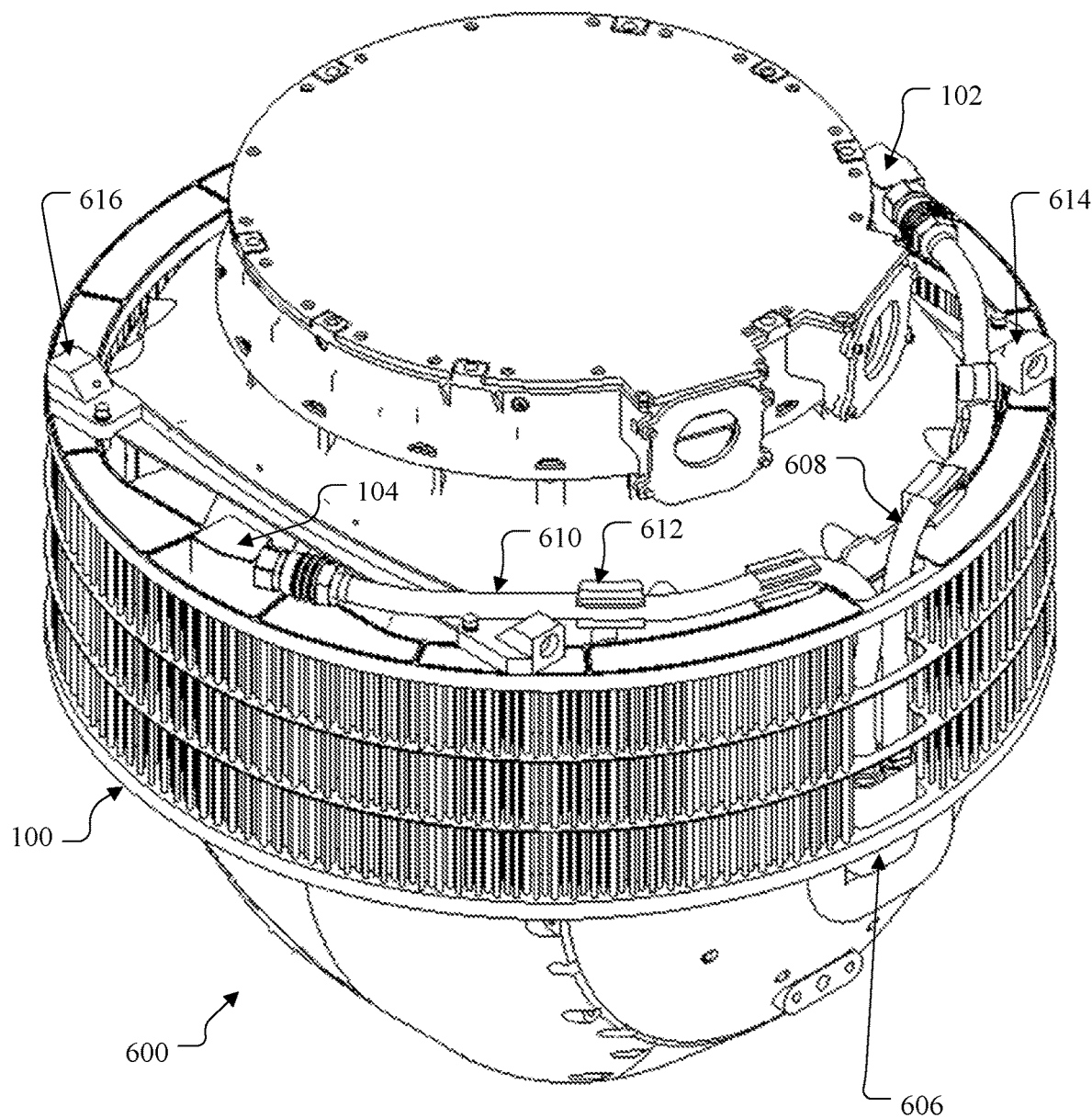
Figure 8:
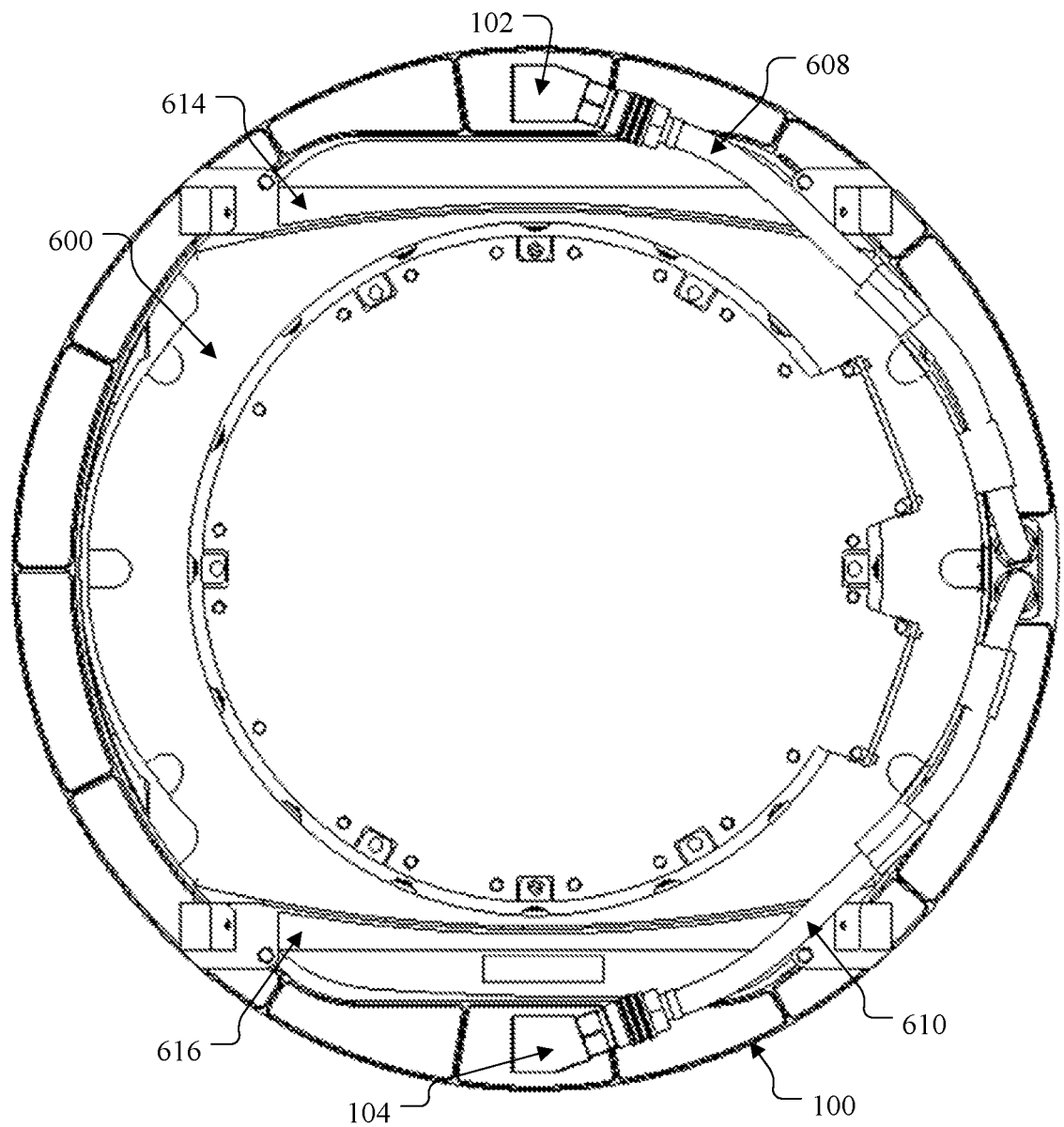

FIGS. 1 through 5 illustrate a first example heat exchanger 100 for a multi-axis gimbal pointing or targeting system in accordance with this disclosure. In particular, FIG. 1 illustrates a perspective view of the heat exchanger 100, FIG. 2 illustrates a front view of the heat exchanger 100, and FIG. 3 illustrates a top view of the heat exchanger 100. Also, FIG. 4 illustrates a cross-sectional view of the heat exchanger 100 taken along line A-A in FIG. 2, and FIG. 5 illustrates a cross-sectional view of the heat exchanger 100 taken along line B-B in FIG. 3.

As shown in FIGS. 1 through 5, the heat exchanger 100 includes at least one inlet 102 and at least one outlet 104. Each inlet 102 represents a structure configured to receive fluid (such as liquid or gas) into the heat exchanger 100, and each outlet 104 represents a structure configured to provide the fluid from the heat exchanger 100. The fluid received through the inlet 102 is warmer and contains heat to be rejected into an ambient environment by the heat exchanger 100, and the fluid provided through the outlet 104 is cooler. Each inlet 102 can be coupled to receive incoming fluid from a cooling system, and each outlet 104 can be coupled to provide outgoing fluid back to the cooling system. While a single inlet 102 and a single outlet 104 are shown here, more than one inlet 102 or more than one outlet 104 can be used.

Each inlet 102 and outlet 104 can be formed from any suitable material(s). For example, each inlet 102 and outlet 104 can be formed from steel, aluminum, plastic, or other material(s) to which tubes or other fluid passages can be connected in order to receive or provide fluid. Note that the size, shape, and dimensions of each inlet 102 and outlet 104 are examples only and that each inlet 102 and outlet 104 can have any other suitable form. In particular embodiments, the inlet 102 and outlet 104 represent 0.563-18UNF flanges configured to receive O-ring seals.

The heat exchanger 100 also includes numerous flow channels 106 that are used to transport fluid multiple times back and forth between a top and a bottom of the heat exchanger 100 as the fluid moves from the inlet 102 to the outlet 104. Each flow channel 106 represents a structure that allows fluid to flow through the structure, such as a tube. Heat from the fluid is absorbed by the flow channels 106 and then transferred from the flow channels 106 into surrounding air in order to cool the fluid. The flow channels 106 therefore represent heat rejection interfaces that extend substantially around the heat exchanger 100 and that reject heat from the fluid. Since the fluid flow here is divided among multiple flow channels 106, this can help to create parallel fluid flows in the heat exchanger 100 and to reduce an overall fluid-side pressure loss in the heat exchanger 100.

Each flow channel 106 can be formed from any suitable material(s), such as steel, aluminum, plastic, or other material(s) having an adequate thermal conductivity that allows heat from fluid in the flow channel 106 to be removed. Each flow channel 106 can also be formed using a combination of materials, such as a ceramic interior and a steel, aluminum, plastic, or other exterior. Note that the number and arrangement of the flow channels 106 here are for illustration only and that any number of flow channels 106 in any suitable arrangement can be used in the heat exchanger 100.

The flow channels 106 are positioned here so that they extend from a top ring 108 positioned along the top of the heat exchanger 100 to a bottom ring 110 positioned along the bottom of the heat exchanger 100. The top and bottom rings 108 and 110 include internal passageways that allow the fluid to flow between different flow channels 106. Thus, the flow channels 106 and the rings 108 and 110 form fluid pathways between the inlet 102 and the outlet 104. As a result, fluid entering the heat exchanger 100 through the inlet 102 passes through the top ring 108 into some of the flow channels 106. The fluid then passes through the flow channels 106, the bottom ring 110, other flow channels 106, the top ring 108, still other flow channels 106, and so on until reaching the outlet 104.

The top ring 108 generally includes multiple internal fluid passages 108a-108n, and the bottom ring 110 generally includes multiple internal fluid passages 110a-110n. Each passage 108a-108n, 110a-110n allows fluid to enter that passage from one or more flow channels 106 and to exit that passage through one or more other flow channels 106. One or more plates 112 can be secured to each of the top and bottom rings 108 and 110 in order to define the fluid passages 108a-108n, 110a-110b within the rings 108 and 110. Each plate 112 can be welded or otherwise secured to the top or bottom ring 108 and 110 to prevent fluid leakage.

The top ring 108, the bottom ring 110, and the plates 112 can each be formed from any suitable material(s), such as steel, aluminum, plastic, or other material(s). In some embodiments, each plate 112 can be secured to the top or bottom ring 108 or 110 and adjacent plates 112 can be secured to each other via welding. In this type of approach, the plates 112 would be secured only along their collective inner and outer diameters to the top and bottom rings 108 or 110. Note that the term "ring" here does not require that the top and bottom rings 108 and 110 be circular and that other shapes for the top and bottom rings 108 and 110 can be used. Also note that a "ring" does not need to be continuous around the heat exchanger's entire circumference and can be segmented into individual parts that arc around a portion of the heat exchanger's circumference.

Multiple torsional stiffeners 114 can be connected to the top and bottom rings 108 and 110. Each torsional stiffener 114 generally represents a plate or other suitable structure configured to resist twisting or torsion of the heat exchanger 100. Each torsional stiffener 114 can be formed from any suitable material(s), such as steel, aluminum, plastic, or other material(s). Each torsional stiffener 114 can also be attached to the top and bottom rings 108 and 110 in any suitable manner, such as via welding. Each torsional stiffener 114 in this example includes a projection 116 having a hole configured to receive a bolt, captive screw, or other connector. The connectors can be used to secure the heat exchanger 100 to a gimbal or other portion of a pointing or targeting system. Each projection 116 includes any suitable structure configured to receive a connector, such as a receptacle for a #8-32UNC bolt.

Optionally, one or more intermediate plates 118 can be positioned between the top and bottom rings 108 and 110 in order to provide structural reinforcement to the flow channels 106 or the heat exchanger 100. When used, each flow channel 106 can be formed using multiple segments, where each segment is above an intermediate plate 118 and/or below an intermediate plate 118. Each intermediate plate 118 includes internal passages connecting the segments of the flow channels 106 above and below that intermediate plate 118. Each intermediate plate 118 can be formed from any suitable material(s), such as steel, aluminum, plastic, or other material(s).

A cross-section of the top ring 108 is shown in FIG. 4. As can be seen in FIG. 4, the top ring 108 includes various holes 120 that align with the flow channels 106 under the top ring 108. Fluid entering the inlet 102 can pass through some of the holes 120 of the top ring 108 into some of the flow channels 106. The fluid then travels down and up repeatedly in different flow channels 106 and through different holes 120 of the top ring 108 until reaching the outlet 104. Similar holes 120 can be used in the bottom ring 110.

Note that in this particular embodiment, there is a gap 122 in which the flow channels 106 are missing in the heat exchanger 100. Instead, a larger tube 124 can be used to direct fluid around the gap 122 so that the fluid continues to move from the inlet 102 towards the outlet 104. Also, the top and bottom rings 108 and 110 and any intermediate plates 118 are notched and have a reduced width in the gap 122. The gap 122 may not be immediately clear in FIG. 2 since the flow channels 106 at the back of the heat exchanger 100 are visible through the gap 122 in the front of the heat exchanger 100. As explained below, the gap 122 is used to accommodate part of a specific equipment package that can be used with the heat exchanger 100. However, the gap 122 and the tube 124 are not required if the heat exchanger 100 is used with an equipment package that does not require this type of accommodation. Also, other modifications can be made to the heat exchanger 100 to provide other types of accommodations for equipment packages.

During operation, air flows through gaps between the flow channels 106, and the flow channels 106 convect heat from the fluid passing through the flow channels 106 into the surrounding air. Heat can also be absorbed from the fluid by the top and bottom rings 108 and 110, the torsional stiffeners 114, and the intermediate plates 118 (or any subset thereof) and convected into the surrounding air. This removes the heat from the fluid so that the fluid exiting the outlet 104 is cooler (and possibly significantly cooler) than the fluid entering the inlet 102. Significant cooling can be achieved when the heat exchanger 100 is used at high altitudes or at high speeds since the surrounding air can be significantly cooler than the fluid traveling through the heat exchanger 100 or can otherwise remove significant amounts of heat from the fluid traveling through the heat exchanger 100.

The heat exchanger 100 can have any suitable size, shape, and dimensions. For example, the heat exchanger 100 can have an outer diameter of about 20 inches (about 50.8 cm) to about 22 inches (about 55.88 cm) and an inner diameter of about 19 inches (about 48.26 cm) to about 21 inches (about 53.34 cm). Also, the heat exchanger 100 can have a height as measured from the top of the top ring 108 to the bottom of the bottom ring 110 (excluding the inlet 102 and outlet 104) of about 5.9 inches (about 14.986 cm) to about 6 inches (about 15.24 cm). Each of the top ring 108 and the bottom ring 110 (excluding the inlet 102 and outlet 104) can have a thickness of about 0.4 inches (about 1.016 cm). The two projections 116 located on opposite sides of the inlet 102 can be about 10.3 inches (about 26.162 cm) apart, and the two projections 116 located on opposite sides of the outlet 104 can be about 10.3 inches (about 26.162 cm) apart. The two projections 116 located on opposite sides of the inlet 102 can be about 14.8 includes (about 37.592 cm) away from the two projections 116 located on opposite sides of the outlet 104. The heat exchanger 100 can be configured to hold about 0.62 gallons (about 2.347 liters) of fluid. Of course, these dimensions and other values are for illustration only, and the heat exchanger 100 can have any other suitable dimensions and other values.

The heat exchanger 100 can also be fabricated in any suitable manner. For example, individual components of the heat exchanger 100 can be fabricated separately and connected together. The individual components can be fabricated using casting, injection molding, additive manufacturing (such as selective laser sintering), subtractive manufacturing, or any other suitable process. The individual components can also be connected together in any suitable manner, such as by welding or brazing. It is also possible for at least some of the components in the heat exchanger 100 to be fabricated as a single integral part, which can be attached to one or more additional parts (if needed) to form the completed heat exchanger 100. As a particular example, the flow channels 106, one or more intermediate plates 118, and the top and bottom rings 108 and 110 (minus the plates 112) can be formed as a single integral part. The plates 112 (at least some of which can carry the one or more inlets 102 and the one or more outlets 104), the torsional stiffeners 114, and optionally the tube 124 can be welded or otherwise attached to the integral part to form the heat exchanger 100.

Although FIGS. 1 through 5 illustrate a first example of a heat exchanger 100 for a multi-axis gimbal pointing or targeting system, various changes may be made to FIGS. 1 through 5. For example, the sizes, shapes, and dimensions of the overall heat exchanger 100 and its individual components are for illustration only. The heat exchanger 100 or any of its parts can have any other suitable size, shape, and dimensions. As a particular example, the flow channels 106 of the heat exchanger 100 can have non-uniform lengths in different areas of the heat exchanger 100. Also, in this example, the heat exchanger 100 represents a vertical tube-type radiator that removes heat from fluid by passing the fluid through multiple vertical flow channels 106. However, other embodiments of the heat exchanger 100 can be used, such as those that use fins (as described below) to reject heat into the surrounding air. In addition, the various components of the heat exchanger 100 can be moved or repositioned as needed or desired. For instance, the inlet 102 and the outlet 104 can be positioned on different rings 108 and 110.

FIGS. 6 through 9 illustrate an example multi-axis gimbal pointing or targeting system 600 that uses the first example heat exchanger 100 in accordance with this disclosure. Note that the pointing or targeting system 600 shown here is one example of the type of system with which the heat exchanger 100 can be used. However, the heat exchanger 100 can be used with any other suitable pointing or targeting system.

As shown in FIGS. 6 through 9, the pointing or targeting system 600 includes a gimbal 602 and an equipment package 604. The gimbal 602 includes a base 602a configured to be mounted on or otherwise secured to a vehicle, an azimuth yoke 602b configured to be rotated by the base 602a, and elevation covers 602c that are configured to rotate the equipment package 604. The gimbal 602 operates to rotate the equipment package 604 around an azimuth axis extending vertically through a center of the equipment package 604 using the azimuth yoke 602b of the gimbal 602. The gimbal 602 also operates to rotate the equipment package 604 around an elevation axis extending horizontally through a center of the equipment package 604 using the elevation covers 602c of the gimbal 602. The gimbal 602 can rotate the equipment package 604 independently in the azimuth and elevation axes to orient the equipment package 604 at various pointing angles with respect to a vehicle.

The gimbal 602 represents any suitable structure configured to selectively orient equipment in multiple directions. The equipment package 604 represents any suitable equipment that can capture data or perform other functions in different directions with respect to a vehicle. The equipment package 604 can, for example, include electro-optical/infrared (EO/IR) sensors, laser designators, laser illuminators, or other equipment used to collect data or perform other functions.

Figure 9:
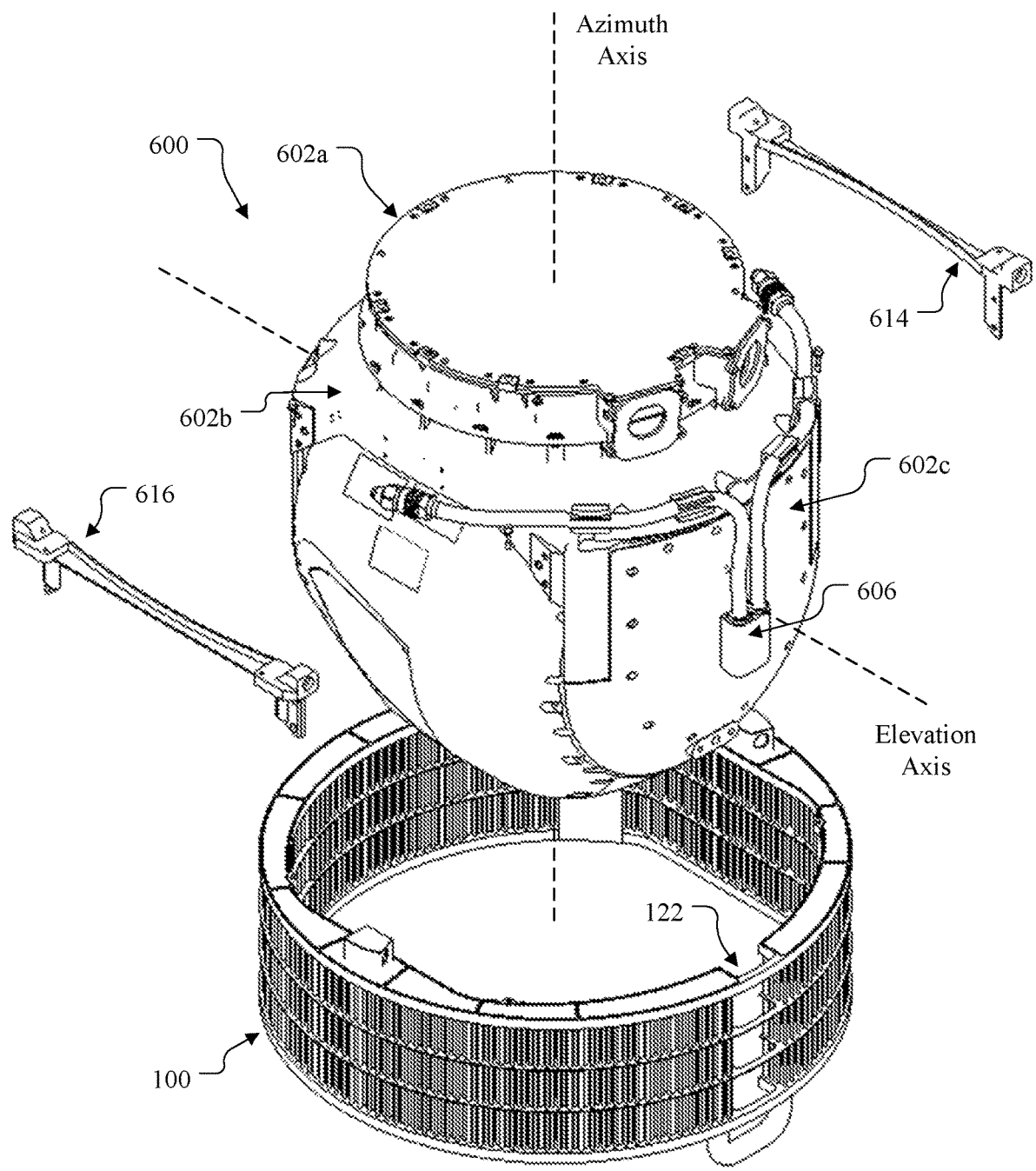

In this example, the equipment package 604 includes or is coupled to two hose connectors 606, and the hose connectors 606 are coupled to two hoses 608 and 610. The hose 608 is also coupled to the inlet 102 of the heat exchanger 100, and the hose 610 is also coupled to the outlet 104 of the heat exchanger 100. The equipment package 604 can include an internal pump that pumps fluid out one of the hose connectors 606 into the hose 608 and that receives fluid from the hose 610 through another of the hose connectors 606. As can be seen in FIG. 9, the gap 122 in the heat exchanger 100 accommodates the presence of the hose connectors 606. However, the hose connectors 606 can be positioned elsewhere for coupling to the heat exchanger 100, in which case the gap 122 can be omitted.

Each hose connector 606 represents any suitable structure configured to be fluidly coupled to a hose. Each hose 608 and 610 represents any suitable structure configured to transport fluid, and each hose 608 and 610 can include a quick-disconnect, no-drip hose connection that attaches the hose to the inlet 102 or outlet 104. Various clips 612 can be used to secure the hoses 608 and 610 in place. Each clip 612 represents any suitable structure configured to receive and retain a fluid hose.

In this example, two heat exchanger adapter brackets 614 and 616 are used to couple the heat exchanger 100 to the gimbal 602. For example, each of the adapter brackets 614 and 616 can include holes that allow the brackets 614 and 616 to be secured to a boresight module mounting or other portion of the azimuth yoke 602b of the gimbal 602, such as by using bolts or screws. Each of the adapter brackets 614 and 616 can also include holes that allow captive screws or other connectors to pass through the adapter bracket and into the projections 116 (not shown in FIGS. 6 through 9) of the heat exchanger 100. The heat exchanger 100 can therefore be attached to the adapter brackets 614 and 616, and the adapter brackets 614 and 616 can be attached to the gimbal 602 in order to secure the heat exchanger 100 to the pointing or targeting system 600. Each adapter bracket 614 and 616 can be formed from any suitable material(s), such as steel, aluminum, plastic, or other material(s). Note, however, that the use of one or more adapter brackets is not needed if the heat exchanger 100 is sized and shaped for direct coupling to the gimbal 602.

While not shown here, the elevation covers 602c of the gimbal 602 can be configured to be coupled to two lifting handles. For example, each lifting handle can include a surface that is placed over the associated elevation cover 602c of the gimbal 602 and that is secured to the gimbal 602 or to the adapter brackets 614 and 616 using captive screws or other connectors. Once attached, each lifting handle can be raised or lowered by a person for installation or removal of the equipment package, or each lifting handle can include a loop that can be connected to lifting machinery for mechanical raising or lowering.

Although FIGS. 6 through 9 illustrate one example of a multi-axis gimbal pointing or targeting system 600 that uses the first example heat exchanger 100, various changes may be made to FIGS. 6 through 9. For example, various components of the pointing or targeting system 600 can be moved or omitted, and additional components can be added to the pointing or targeting system 600. Also, the pointing or targeting system 600 can support the use of any suitable gimbal 602 and any suitable equipment package 604 and need not include the specific gimbal 602 and the specific equipment package 604 shown here. In addition, while the gimbal 602 and the equipment package 604 here may be configured for installation on the bottom of a vehicle, gimbals and equipment packages can be configured for installation on the top or other surface of a vehicle.

Figure 10:
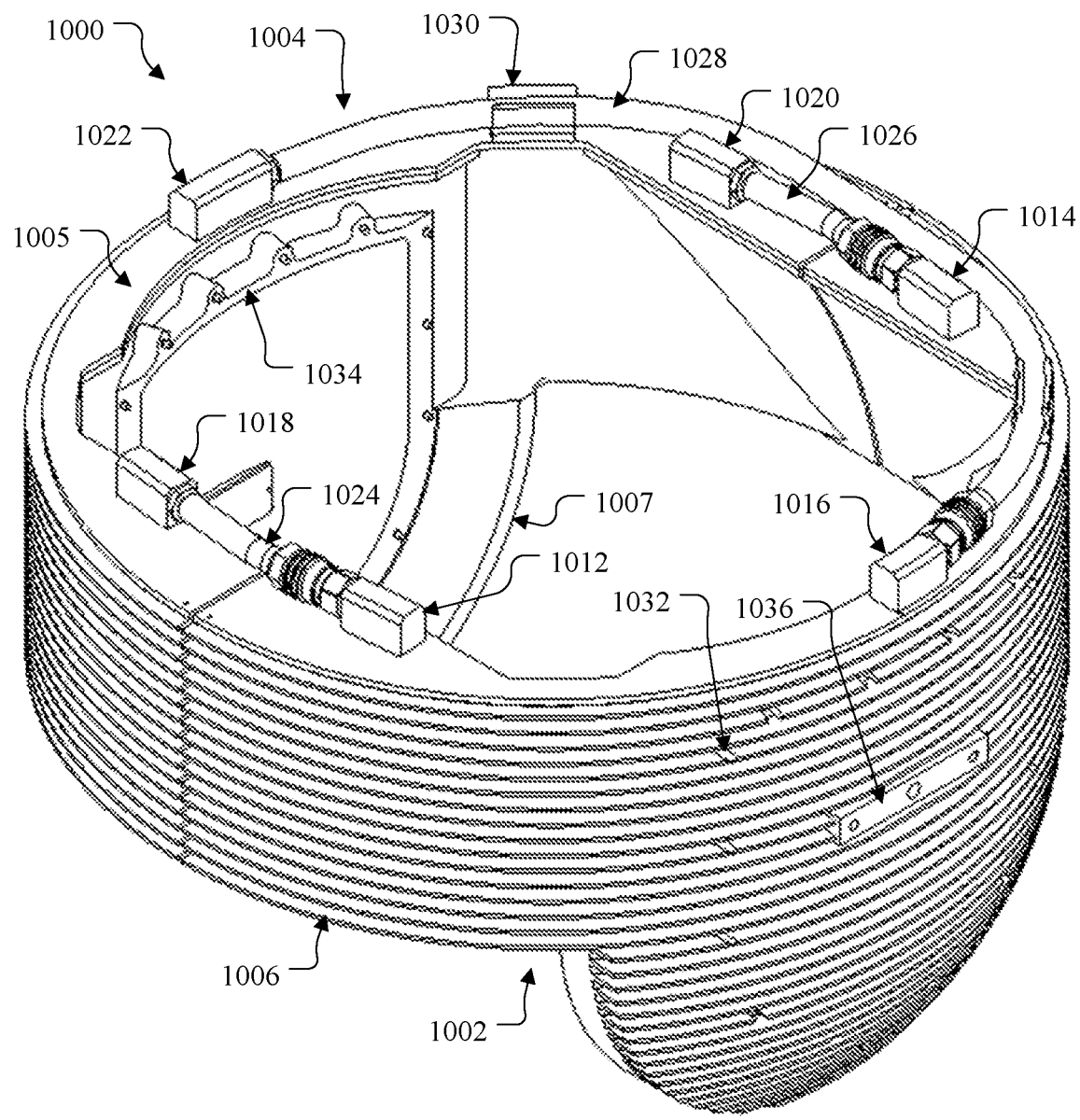
FIGS. 10 through 13 illustrate a second example heat exchanger for a multi-axis gimbal pointing or targeting system in accordance with this disclosure.
Figure 11:
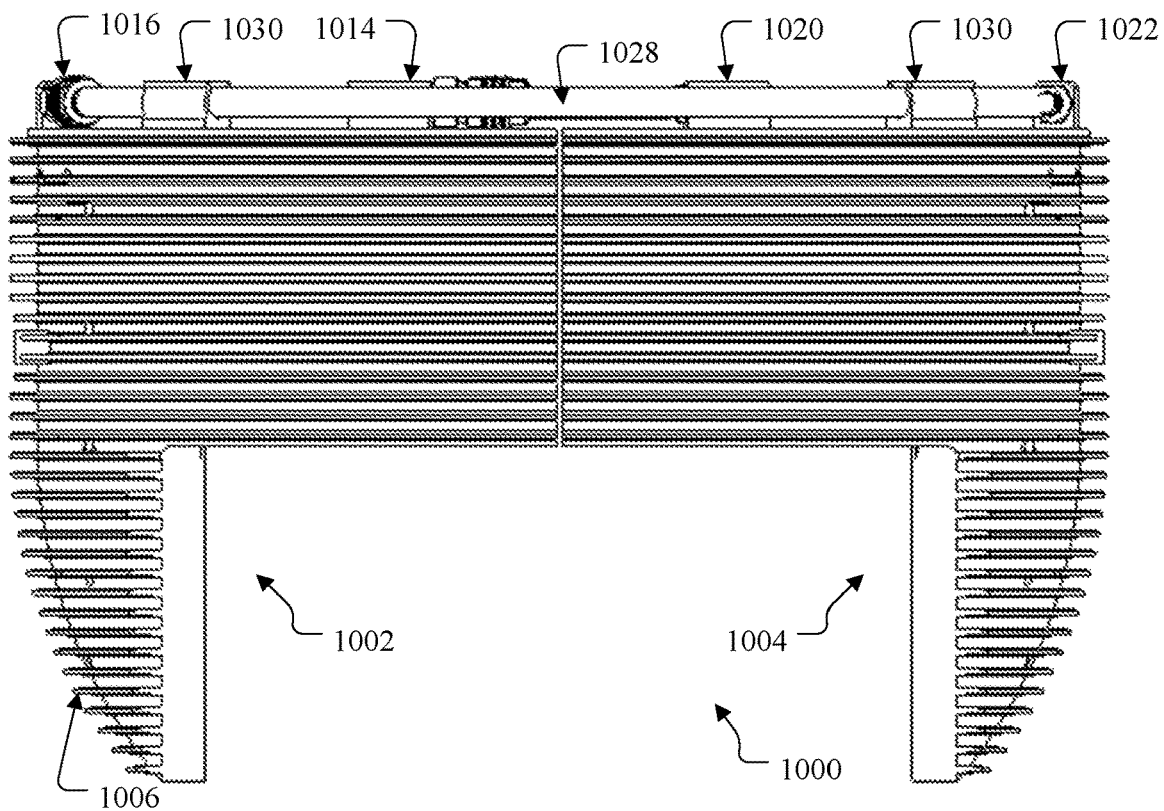
Figure 12:
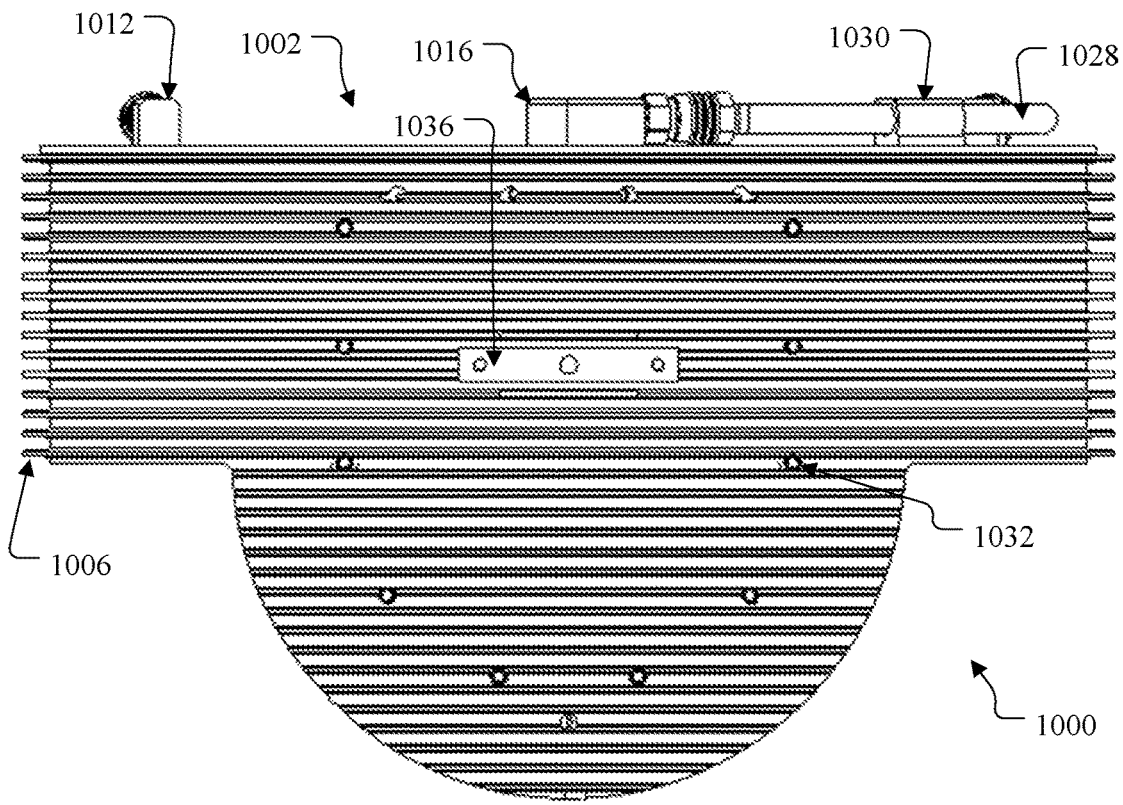
Figure 13:
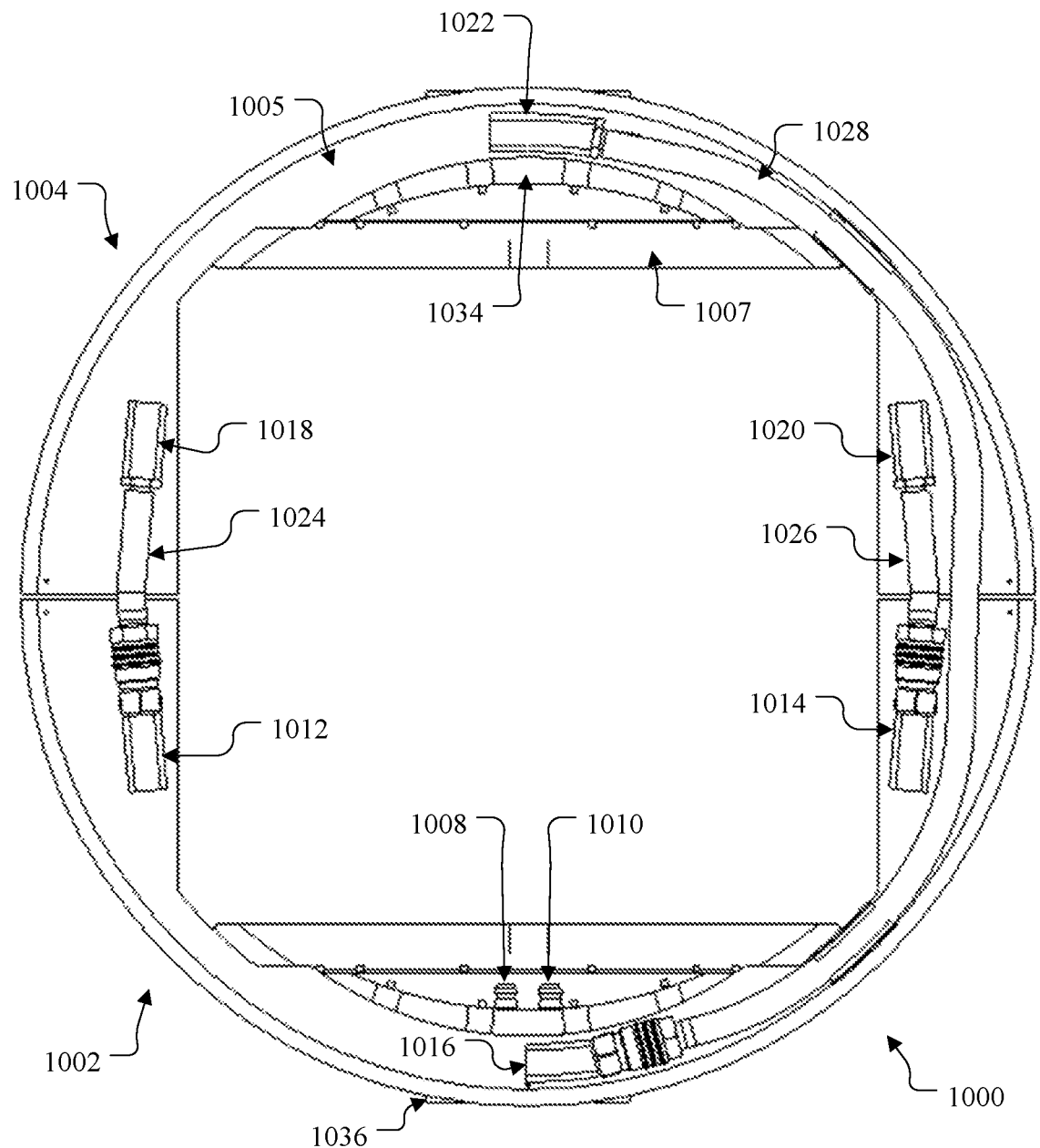
Figure 14:
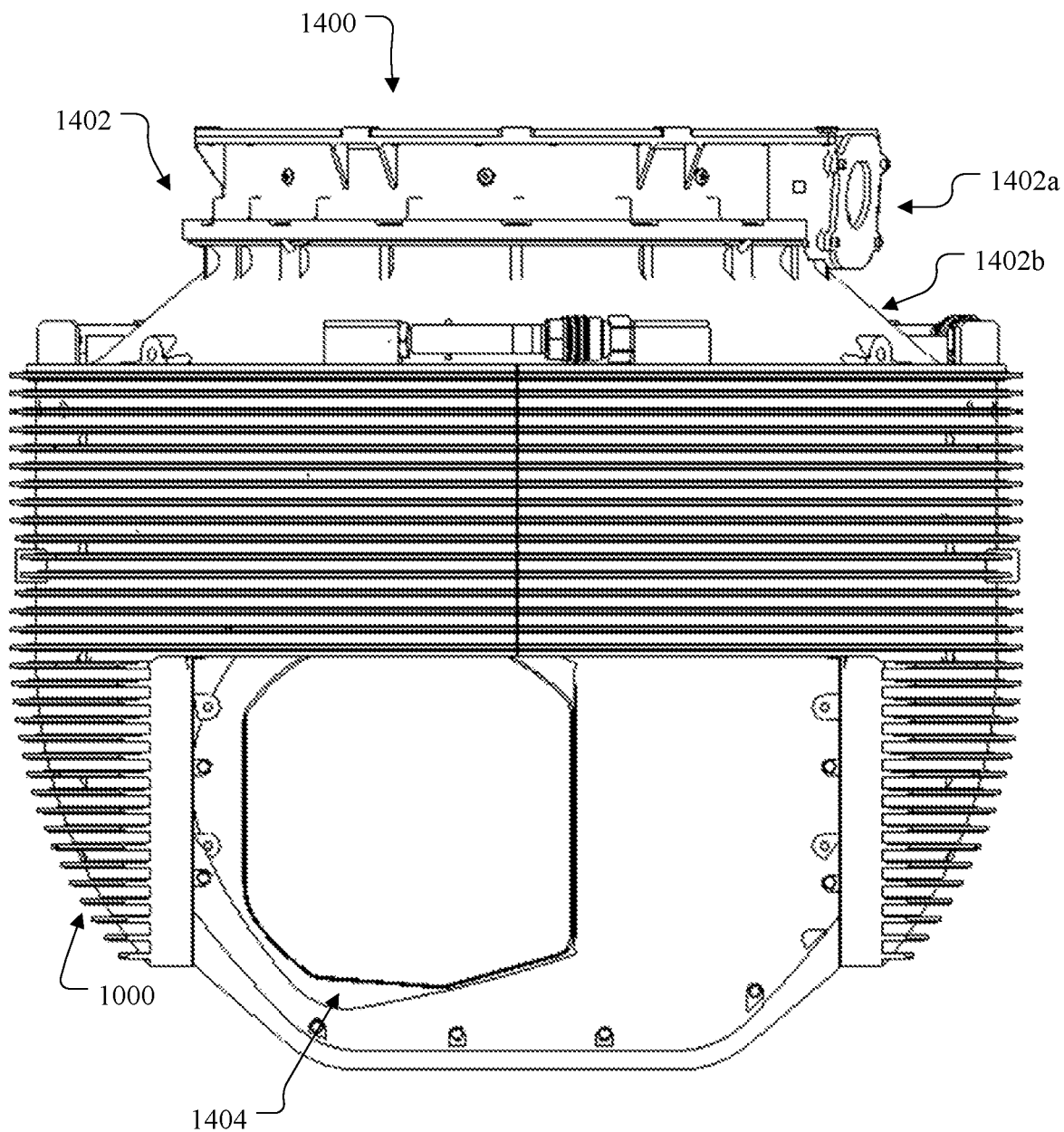
FIGS. 14 through 17 illustrate an example multi-axis gimbal pointing or targeting system that uses the second example heat exchanger in accordance with this disclosure.
Figure 15:
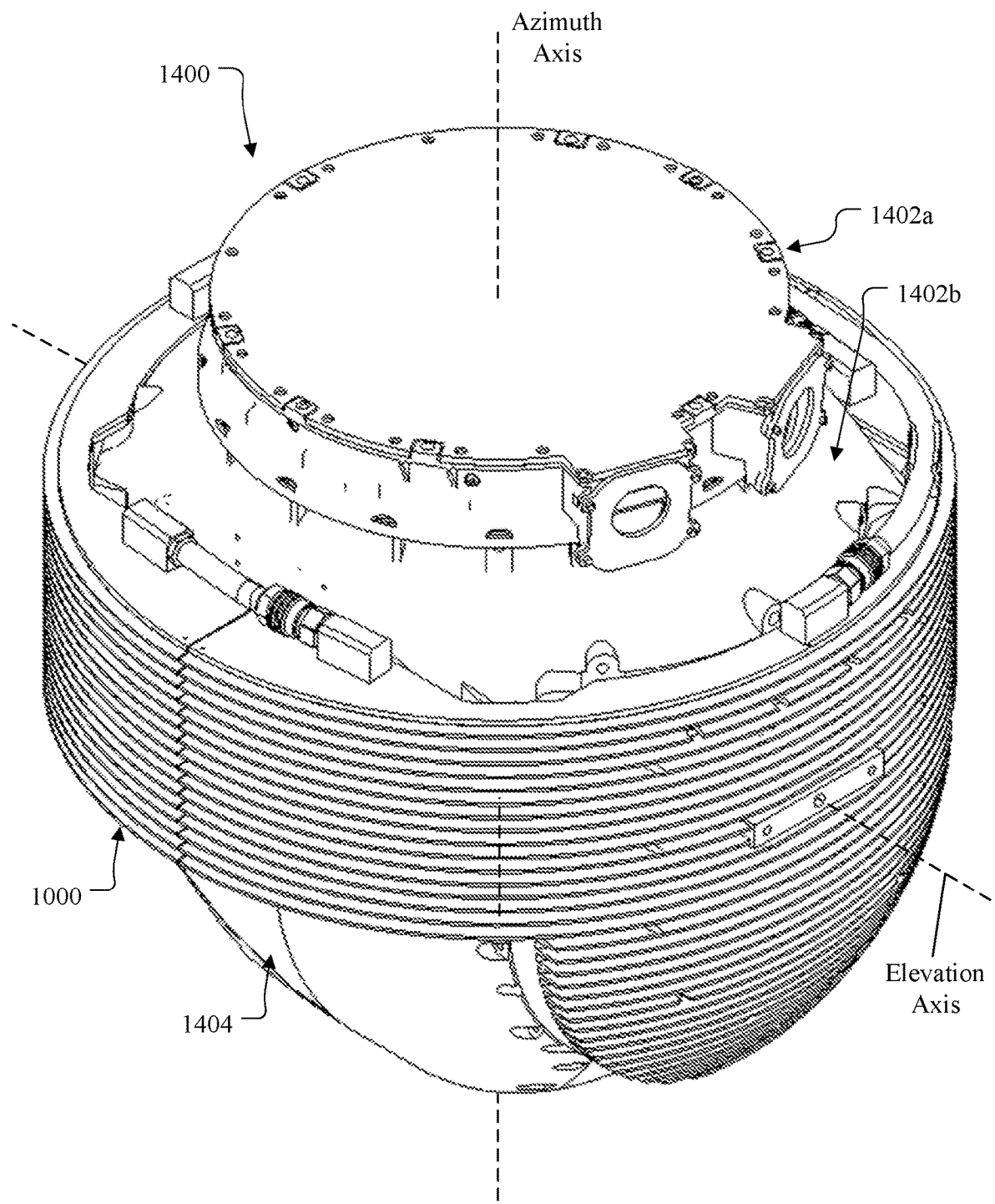
Figure 16:
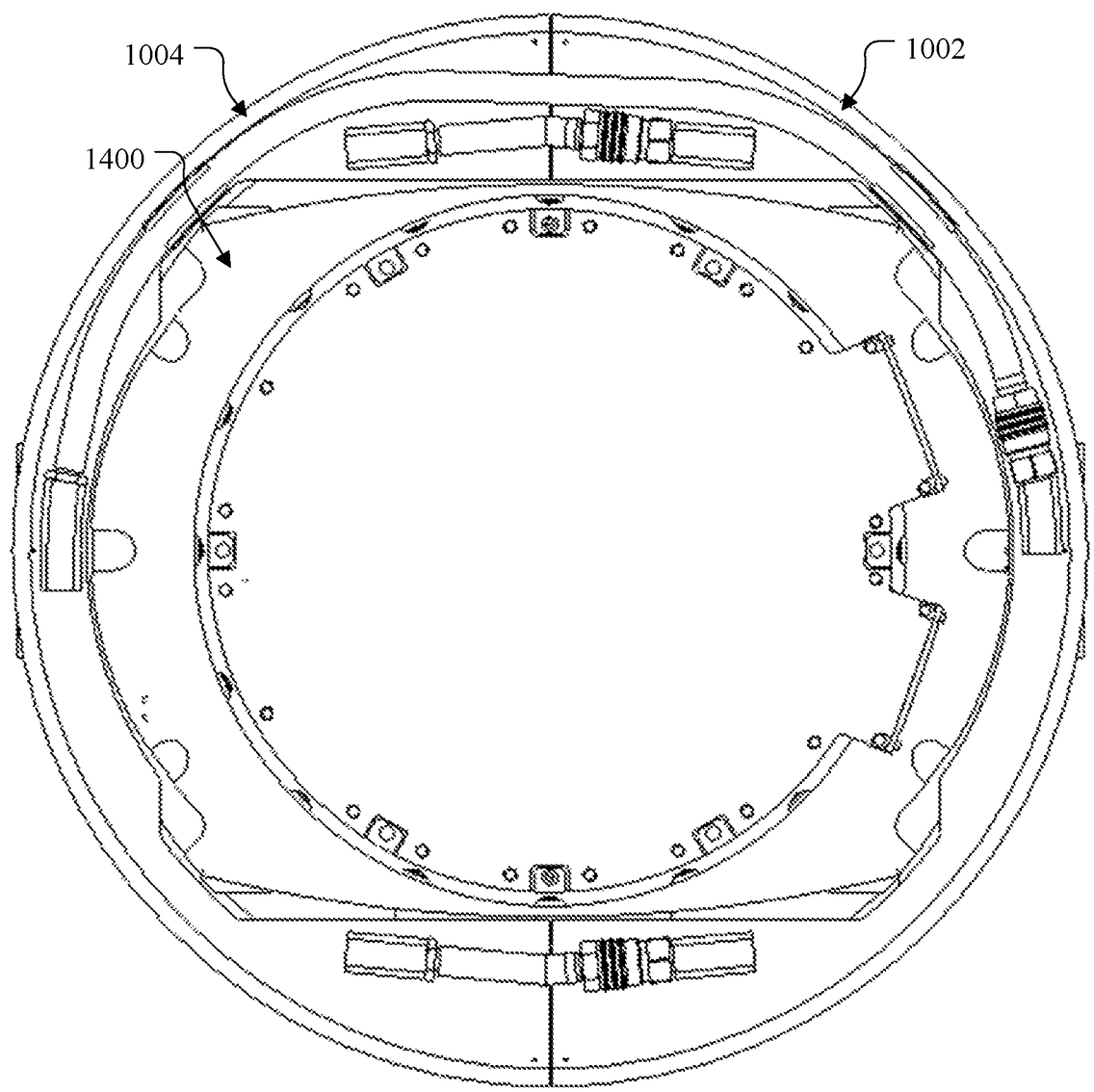
Figure 17:
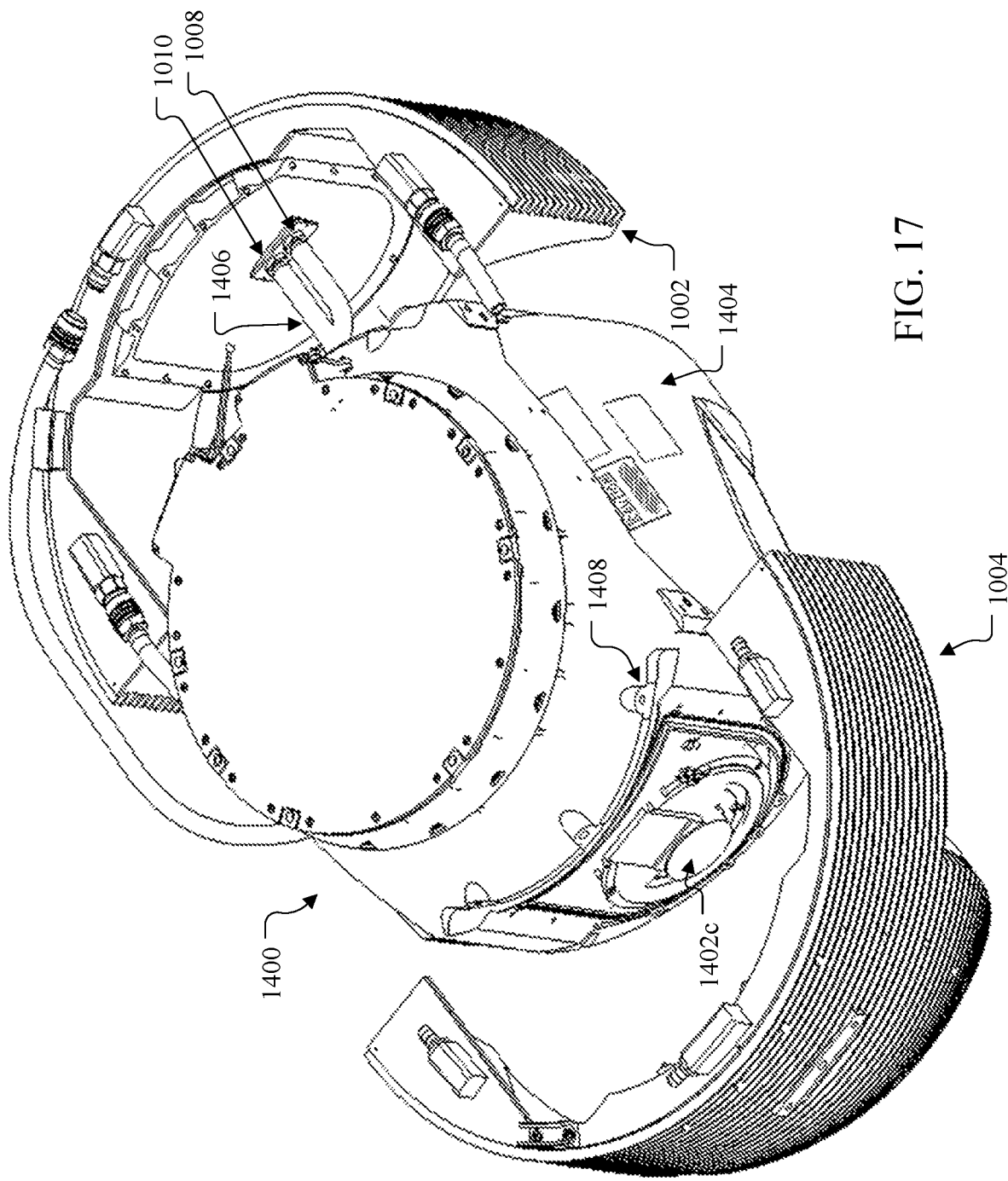

FIGS. 10 through 13 illustrate a second example heat exchanger 1000 for a multi-axis gimbal pointing or targeting system in accordance with this disclosure. In particular, FIG. 10 illustrates a perspective view of the heat exchanger 1000, FIG. 11 illustrates a rear view of the heat exchanger 1000, FIG. 12 illustrates a side view of the heat exchanger 1000, and FIG. 13 illustrates a top view of the heat exchanger 1000.

As shown in FIGS. 10 through 13, the heat exchanger 1000 is divided into a first portion 1002 and a second portion 1004 that can be placed around an equipment package or gimbal (not shown in FIGS. 10 through 13). Each portion 1002 and 1004 of the heat exchanger 1000 can represent half of the heat exchanger 1000, although other divisions between the portions 1002 and 1004 can be used. Each portion 1002 and 1004 of the heat exchanger 1000 is configured to receive fluid, remove heat from the fluid, and reject the absorbed heat into an ambient environment. Plates 1005 can be secured to the tops of the first and second portions 1002 and 1004 of the heat exchanger 1000. Each plate 1005 can be welded or otherwise secured to the first or second portion 1002 or 1004 of the heat exchanger 1000 to prevent fluid leakage. Bottoms 1007 of the portions 1002 and 1004 of the heat exchanger 1000 can be angled inward to help maintain proper positioning of the heat exchanger 1000 with respect to an equipment package or gimbal.

Each portion 1002 and 1004 of the heat exchanger 1000 can be formed from any suitable material(s), such as steel, aluminum, plastic, or other material(s) having an adequate thermal conductivity that allows heat from fluid to be removed. Each portion 1002 and 1004 of the heat exchanger 1000 can also be formed using a combination of materials, such as a ceramic interior and a steel, aluminum, plastic, or other exterior. Each plate 1005 can be formed from any suitable material(s), such as steel, aluminum, plastic, or other material(s). In some embodiments, each plate 1005 can be secured to the first or second portion 1002 or 1004 of the heat exchanger 1000 via welding only along its outer periphery.

In this example, each portion 1002 and 1004 of the heat exchanger 1000 includes various raised projections 1006 extending from that portion. Air can flow between the projections 1006 to help remove heat from the heat exchanger 1000. The projections 1006 therefore represent heat rejection interfaces that extend substantially around the heat exchanger 1000 and that reject heat from the fluid. Each projection 1006 can have any suitable form, such as a long fin. Note that while the projections 1006 here are long and extend around most or all of the heat exchanger 1000, segmented fins or other segmented projections can also be used with the heat exchanger 1000. Each projection 1006 can be formed from any suitable material(s), such as steel, aluminum, plastic, or other material(s) having an adequate thermal conductivity that allows heat from fluid to be rejected into surrounding air.

The heat exchanger 1000 also includes at least one inlet 1008 and at least one outlet 1010. Each inlet 1008 represents a structure configured to receive fluid (such as liquid or gas) into the heat exchanger 1000, and each outlet 1010 represents a structure configured to provide the fluid from the heat exchanger 1000. The fluid received through the inlet 1008 is warmer and contains heat to be rejected into an ambient environment by the heat exchanger 1000, and the fluid provided through the outlet 1010 is cooler (and possibly significantly cooler). Each inlet 1008 can be coupled to receive incoming fluid from a cooling system, and each outlet 1010 can be coupled to provide outgoing fluid back to the cooling system. While a single inlet 1008 and a single outlet 1010 are shown here, more than one inlet 1008 or more than one outlet 1010 can be used.

Each inlet 1008 and outlet 1010 can be formed from any suitable material(s). For example, each inlet 1008 and outlet 1010 can be formed from steel, aluminum, plastic, or other material(s) to which tubes or other fluid passages can be connected in order to receive or provide fluid. Note that the size, shape, and dimensions of each inlet 1008 and outlet 1010 are examples only and that each inlet 1008 and outlet 1010 can have any other suitable form. In some embodiments, each inlet 1008 and outlet 1010 can include a rotary joint that allows a hose connected to the inlet 1008 or outlet 1010 to rotate as an equipment package rotates about its elevation axis.

The first portion 1002 of the heat exchanger 1000 includes three hose connectors 1012, 1014, and 1016. The second portion 1004 of the heat exchanger 1000 includes three hose connectors 1018, 1020, and 1022. The hose connectors 1012 and 1018 are coupled together using a hose 1024 in order to transport fluid from the first portion 1002 to the second portion 1004 of the heat exchanger 1000. The hose connectors 1014 and 1020 are also coupled together using a hose 1026 in order to transport fluid from the first portion 1002 to the second portion 1004 of the heat exchanger 1000. The hose connectors 1016 and 1022 are coupled together using a hose 1028 in order to transport fluid from the second portion 1004 to the first portion 1002 of the heat exchanger 1000.

Each hose connector 1012-1022 represents any suitable structure configured to be fluidly coupled to a hose. Each hose 1024-1028 represents any suitable structure configured to transport fluid, and each hose 1024-1028 can include a quick-disconnect, no-drip hose connection that attaches the hose to a hose connector. Various clips 1030 can be used to secure the hoses 1024-1028 in place. Each clip 1030 represents any suitable structure configured to receive and retain a fluid hose.

During operation, warmer fluid carries heat from an equipment package into the heat exchanger 1000 through the inlet 1008. The warmer fluid flows through the first portion 1002 of the heat exchanger 1000, and the first portion 1002 of the heat exchanger 1000 removes some of the heat from the fluid and rejects the heat to air flowing around the first portion 1002 of the heat exchanger 1000. The fluid then travels through the hoses 1024 and 1026 into the second portion 1004 of the heat exchanger 1000, and the second portion 1004 of the heat exchanger 1000 removes additional heat from the fluid and rejects the heat to air flowing around the second portion 1004 of the heat exchanger 1000. Cooled fluid then returns to the first portion 1002 of the heat exchanger 1000 through the hose 1028, and the cooled fluid exits the heat exchanger 1000 through the outlet 1010.

In this example, the portions 1002 and 1004 of the heat exchanger 1000 can be attached separately to an equipment package. For example, each portion 1002 and 1004 of the heat exchanger 1000 can include holes 1032 configured to receive captive screws or other connectors used to attach the portion 1002 or 1004 of the heat exchanger 1000 to the equipment package. An inner surface of each portion 1002 and 1004 of the heat exchanger 1000 can include at least one raised ridge 1034 that can contact the outer skin of an equipment package. Note that the shape and size of the raised ridges 1034 are for illustration only and can vary depending at least partially on the external shape and size of the equipment package to be used with the heat exchanger 1000. Optionally, the portions 1002 and 1004 of the heat exchanger 1000 can be coupled to each other using bolts, screws, or other connectors. In other embodiments, the portions 1002 and 1004 of the heat exchanger 1000 are only connected together using the hoses 1024-1028.

Each portion 1002 and 1004 of the heat exchanger 1000 may also optionally include a handle connector 1036. A lifting handle can be secured to each side of an equipment package by passing a bolt, screw, or other connector through the lifting handle and through the middle hole of the connector 1036 into a receptacle on the equipment package. Outer holes of each connector 1036 can receive projections from the lifting handle in order to keep the lifting handle in a horizontal position relative to the equipment package. Once attached, each lifting handle can be raised or lowered by a person for installation or removal of the equipment package, or each lifting handle can include a loop that can be connected to lifting machinery for mechanical raising or lowering.

As can be seen here, the heat exchanger 1000 has a non-uniform height. In particular, the sides of the heat exchanger 1000 are taller and extend farther up and down (and therefore contain more projections 1006), while the front and back of the heat exchanger 1000 are shorter (and therefore contain fewer projections 1006). The front and back of the heat exchanger 1000 here are shorter in order to allow an equipment package to be rotated about its elevation axis. Since the entire heat exchanger 1000 can rotate with the equipment package about its azimuth axis, the sides of the heat exchanger 1000 can be taller to help reject more heat from the equipment package. Note, however, that this is not required, and the heat exchanger 1000 can have a substantially uniform height.

The heat exchanger 1000 can have any suitable size, shape, and dimensions. For example, the heat exchanger 1000 can have an outer diameter of about 20 inches (about 50.8 cm) to about 22 inches (about 55.88 cm) and an inner diameter of about 19 inches (about 48.26 cm) to about 21 inches (about 53.34 cm). Also, the heat exchanger 1000 can have a height in front and back of about 5.9 inches (about 14.986 cm) to about 6 inches (about 15.24 cm), while the sides of the heat exchanger 1000 can have a taller height. Of course, these dimensions are for illustration only, and the heat exchanger 1000 can have any other suitable dimensions.

The heat exchanger 1000 can also be fabricated in any suitable manner. For example, individual components of the heat exchanger 1000 can be fabricated separately and connected together. The individual components can be fabricated using casting, injection molding, additive manufacturing (such as selective laser sintering), subtractive manufacturing, or any other suitable process. The individual components can also be connected together in any suitable manner, such as by welding or brazing. It is also possible for at least some of the components in the heat exchanger 1000 to be fabricated as a single integral part, which can be attached to one or more additional parts (if needed) to form the completed heat exchanger 1000. As a particular example, each portion 1002 and 1004 of the heat exchanger 1000 can be formed substantially as a single integral part, and the plates 1005 carrying the hose connectors 1012-1022 can then be attached to the integral parts.

Although FIGS. 10 through 13 illustrate a second example of a heat exchanger 1000 for a multi-axis gimbal pointing or targeting system, various changes may be made to FIGS. 10 through 13. For example, the sizes, shapes, and dimensions of the overall heat exchanger 1000 and its individual components are for illustration only. The heat exchanger 1000 or any of its parts can have any other suitable size, shape, and dimensions. Also, in this example, the heat exchanger 1000 represents a finned radiator that removes heat from fluid by passing air across exterior fins. However, other embodiments of the heat exchanger 1000 can be used, such as those that use vertical radiator tubes (as described above) to reject heat into the surrounding air. In addition, the various components of the heat exchanger 1000 can be moved or repositioned as needed or desired. For instance, the inlet 1008 and the outlet 1010 can be positioned on different portions 1002 and 1004 of the heat exchanger 1000.

FIGS. 14 through 17 illustrate an example multi-axis gimbal pointing or targeting system 1400 that uses the second example heat exchanger 1000 in accordance with this disclosure. Note that the pointing or targeting system 1400 shown here is one example of the type of system with which the heat exchanger 1000 can be used. However, the heat exchanger 1000 can be used with any other suitable pointing or targeting system.

As shown in FIGS. 14 through 17, the pointing or targeting system 1400 includes a gimbal 1402 and an equipment package 1404. The gimbal 1402 includes a base 1402a configured to be mounted on or otherwise secured to a vehicle, an azimuth yoke 1402b configured to be rotated by the base 1402a, and elevation covers 1402c that are configured to rotate the equipment package 1404. The gimbal 1402 operates to rotate the equipment package 1404 around an azimuth axis extending vertically through a center of the equipment package 1404 using the azimuth yoke 1402b of the gimbal 1402. The gimbal 1402 also operates to rotate the equipment package 1404 around an elevation axis extending horizontally through a center of the equipment package 1404 using the elevation covers 1402c of the gimbal 1402. The gimbal 1402 can rotate the equipment package 1404 independently in the azimuth and elevation axes to orient the equipment package 1404 at various pointing angles with respect to a vehicle.

The gimbal 1402 represents any suitable structure configured to selectively orient equipment in multiple directions. The equipment package 1404 represents any suitable equipment that can capture data or perform other functions in different directions with respect to a vehicle. The equipment package 1404 can, for example, include EO/IR sensors, laser designators, laser illuminators, or other equipment used to collect data or perform other functions.

Multiple hoses 1406 are used here to fluidly couple the heat exchanger 1000 to internal components of the equipment package 1404. One of the hoses 1406 can be connected to the inlet 1008 of the heat exchanger 1000, and another of the hoses 1406 can be connected to the outlet 1010 of the heat exchanger 1000. The equipment package 1404 can include an internal pump that pumps fluid out one of the hoses 1406 into the inlet 1008 and that receives fluid from the outlet 1010 via another of the hoses 1406. Each hose 1406 represents any suitable structure configured to transport fluid, and each hose 1406 can include a quick-disconnect, no-drip hose connection that attaches the hose to the inlet 1108 or outlet 1010.

In this example, the gimbal 1402 includes various receptacles 1408 that align with the holes 1032 (shown in FIGS. 10 through 13) or captive screws or other connectors in the holes 1032 of the heat exchanger 1000. The captive screws or other connectors that are in or that are inserted through the holes 1032 can be screwed into the receptacles 1408 in order to secure the portions 1002 and 1004 of the heat exchanger 1000 to the gimbal 1402. Note, however, that any other suitable mechanisms can be used to secure the portions 1002 and 1004 of the heat exchanger 1000 to the gimbal 1402.

Although FIGS. 14 through 17 illustrate one example of a multi-axis gimbal pointing or targeting system 1400 that uses the second example heat exchanger 1000, various changes may be made to FIGS. 14 through 17. For example, various components of the pointing or targeting system 1400 can be moved or omitted, and additional components can be added to the pointing or targeting system 1400. Also, the pointing or targeting system 1400 can support the use of any suitable gimbal 1402 and any suitable equipment package 1404 and need not include the specific gimbal 1402 and the specific equipment package 1404 shown here. In addition, while the gimbal 1402 and the equipment package 1404 here may be configured for installation on the bottom of a vehicle, gimbals and equipment packages can be configured for installation on the top or other surface of a vehicle.

Figure 18:
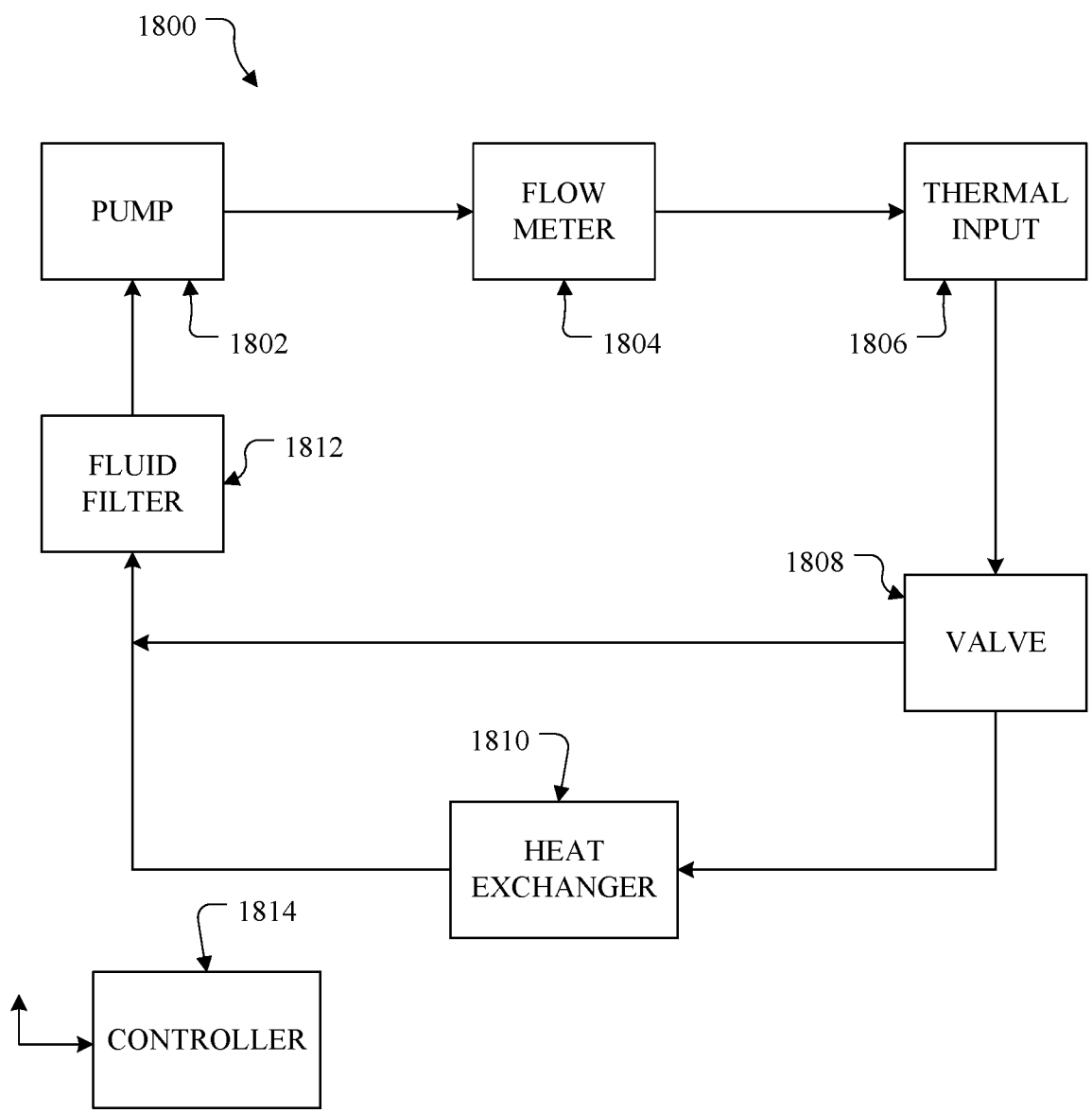
FIG. 18 illustrates an example cooling system for a multi-axis gimbal pointing or targeting system that uses a heat exchanger in accordance with this disclosure.

FIG. 18 illustrates an example cooling system 1800 for a multi-axis gimbal pointing or targeting system that uses a heat exchanger in accordance with this disclosure. For example, the cooling system 1800 can be used within or in conjunction with either of the pointing or targeting systems 600 and 1400. The cooling system 1800 can also include or be used in conjunction with either of the heat exchangers 100 and 1000.

As shown in FIG. 18, the cooling system 1800 forms a cooling loop and includes various components configured to move fluid through the cooling loop. Any suitable fluid can be transported in the cooling loop, such as poly-alpha-olefin (PAO) or an antifreeze/water mixture. The specific fluid used in the cooling loop can vary based on a number of factors, such as the material(s) forming the components used in the cooling system 1800 and the expected amount of heat to be transferred using the fluid.

In this example, a pump 1802 is configured to pump fluid through the cooling loop, and a flow meter 1804 is configured to measure the amount of fluid being provided by the pump 1802. The fluid passes through, over, or near at least one thermal input 1806 in order to absorb heat from the thermal input(s) 1806. The pump 1802 includes any suitable structure configured to move fluid in a cooling loop. The flow meter 1804 includes any suitable structure configured to measure a fluid flow. Each thermal input 1806 includes any suitable source of thermal energy. For example, a thermal input 1806 can represent one or more electronic components, one or more power supplies, or other component(s) within the equipment package 604 or 1404 generating heat during operation.

The flow of the fluid carrying the heat from the thermal input(s) 1806 is controlled by a valve 1808. The valve 1808 directs the fluid to one or both of a heat exchanger 1810 and a fluid filter 1812. The valve 1808 includes any suitable structure configured to selectively provide fluid to one or more destinations. The heat exchanger 1810 represents an air-to-fluid radiator that rejects heat from the fluid into the surrounding air. The heat exchanger 1810 can represent either of the heat exchangers 100 and 1000 described above or any heat exchanger designed in accordance with the principles of this patent document. The fluid filter 1812 removes particulates or other contaminants from the fluid before the fluid is received at the pump 1802. The fluid filter 1812 includes any suitable structure for removing contaminants from fluid.

A controller 1814 can be used in or with the cooling system 1800 to control the operation of various components of the cooling system 1800. For example, the controller 1814 can control the operation of the pump 1802 to control whether the pump 1802 is circulating fluid in the cooling loop or the speed at which the pump 1802 is circulating the fluid in the cooling loop. The controller 1814 can also receive sensor measurements from the flow meter 1804 in order to identify the flow of the fluid in the cooling loop in order to control the operation of the pump 1802.

The controller 1814 can further control the valve 1808 to direct all of the fluid to the heat exchanger 1810 or to allow at least some of the fluid to bypass the heat exchanger 1810 and return to the pump 1802 without cooling in the heat exchanger 1810. Thus, the valve 1808 can be controlled to provide none, some, or all of the fluid to the heat exchanger 1810. In some embodiments, the controller 1814 can execute a thermal control algorithm to control the valve 1808 in order to control the amount of heat being removed from the thermal input 1806 so that the thermal input 1806 remains within a desired temperature range. In particular embodiments, the controller 1814 can control the amount of heat being removed from the equipment package 604 or 1404 so that one or more components in the equipment package 604 or 1404 remain at a desired temperature plus or minus 2° C. Of course, the controller 1814 can maintain the components of the equipment package 604 or 1404 within any other suitable temperature ranges.

The controller 1814 includes any suitable structure for controlling operation of one or more components of a cooling system. For example, the controller 1814 can represent one or more processing devices, such as one or more microprocessors, microcontrollers, digital signal processors, application specific integrated circuits (ASICs), field programmable gate arrays (FPGAs), or discrete circuitry. The controller 1814 can also represent one or more proportional-integral-derivative (PID) controllers or other suitable types of controllers.

It should be noted that various components shown in FIG. 18 can be located in the same device or in different devices. For example, in some embodiments, the entire cooling system 1800 can be integrated into an equipment package 604 or 1404. In these embodiments, the heat exchanger 1810 can be mounted to the equipment package 604 or 1404 as described above, and the remaining components of the cooling system 1800 can be internal to the equipment package 604 or 1404. In other embodiments, some components of the cooling system 1800 can be separate from the equipment package 604 or 1404. For instance, the pump 1802, flow meter 1804, and fluid filter 1812 can reside within a vehicle carrying the equipment package 604 or 1404, and fluid can be provided to and received from the equipment package 604 or 1404 via an associated gimbal 602 or 1402. However, any other physical divisions of the components in the cooling system 1800 can also be used.

Although FIG. 18 illustrates one example of a cooling system 1800 for a multi-axis gimbal pointing or targeting system that uses a heat exchanger, various changes may be made to FIG. 18. For example, the heat exchangers 100 and 1000 can be used in any other suitable manner and need not be used with the specific cooling system 1800 shown here.

Figure 19:
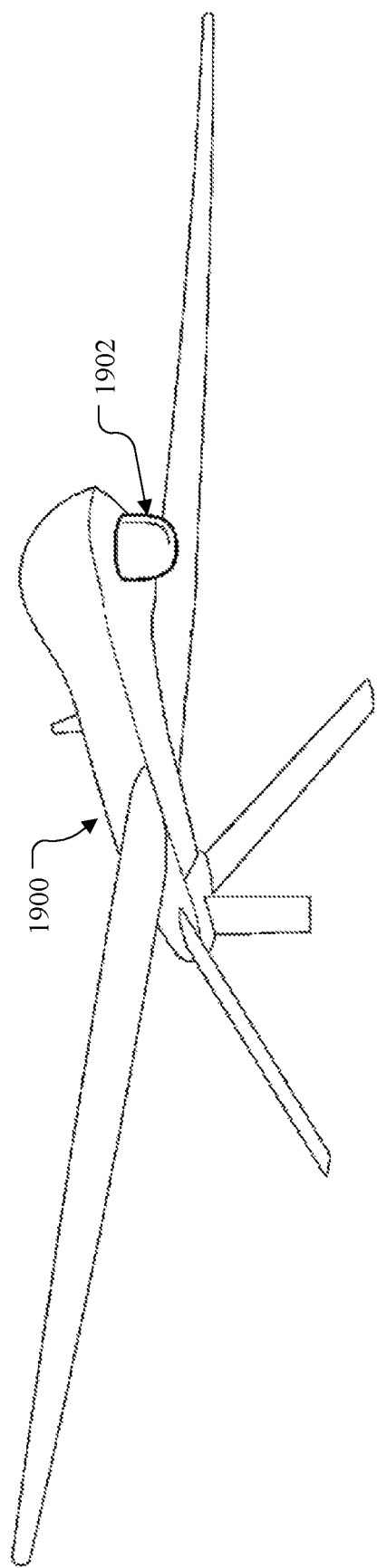
FIG. 19 illustrates an example vehicle having a multi-axis gimbal pointing or targeting system used with a heat exchanger in accordance with this disclosure.

FIG. 19 illustrates an example vehicle 1900 having a multi-axis gimbal pointing or targeting system 1902 used with a heat exchanger in accordance with this disclosure. In this example, the vehicle 1900 represents a drone, and the pointing or targeting system 1902 is positioned at or near the front of the drone. Of course, the pointing or targeting system 1902 can be positioned elsewhere on the vehicle 1900. The pointing or targeting system 1902 can be used to capture still or video images (such as in the visible and infrared spectra), transmit laser signals, capture electromagnetic signals, or perform other functions. As a particular example, the pointing or targeting system 1902 can represent a MULTI-SPECTRAL TARGETING SYSTEM (MTS) from RAYTHEON COMPANY.

While not shown in FIG. 19, the pointing or targeting system 1902 can be used with either of the heat exchangers 100 and 1000 described above or any heat exchanger designed in accordance with the principles of this patent document. The heat exchanger 100 or 1000 can be positioned around a gimbal in the pointing or targeting system 1902 and attached to the azimuth yoke or elevation covers of the gimbal. Thus, regardless of how the pointing or targeting system 1902 is rotated about its azimuth axis and its elevation axis, air can flow over the heat exchanger 100 or 1000 when the vehicle 1900 is in flight. This allows heat to be removed effectively from the pointing or targeting system 1902.

Although FIG. 19 illustrates one example of a vehicle 1900 having a multi-axis gimbal pointing or targeting system 1902 used with a heat exchanger, various changes may be made to FIG. 19. For example, the heat exchangers 100 and 1000 described above can be used with any other suitable pointing or targeting system and with any other suitable vehicle, such as other airborne vehicles like airplanes, ground vehicles like cars, trucks, or sport utility vehicles (including autonomous ground vehicles), and marine vehicles like boats.

Figure 20:
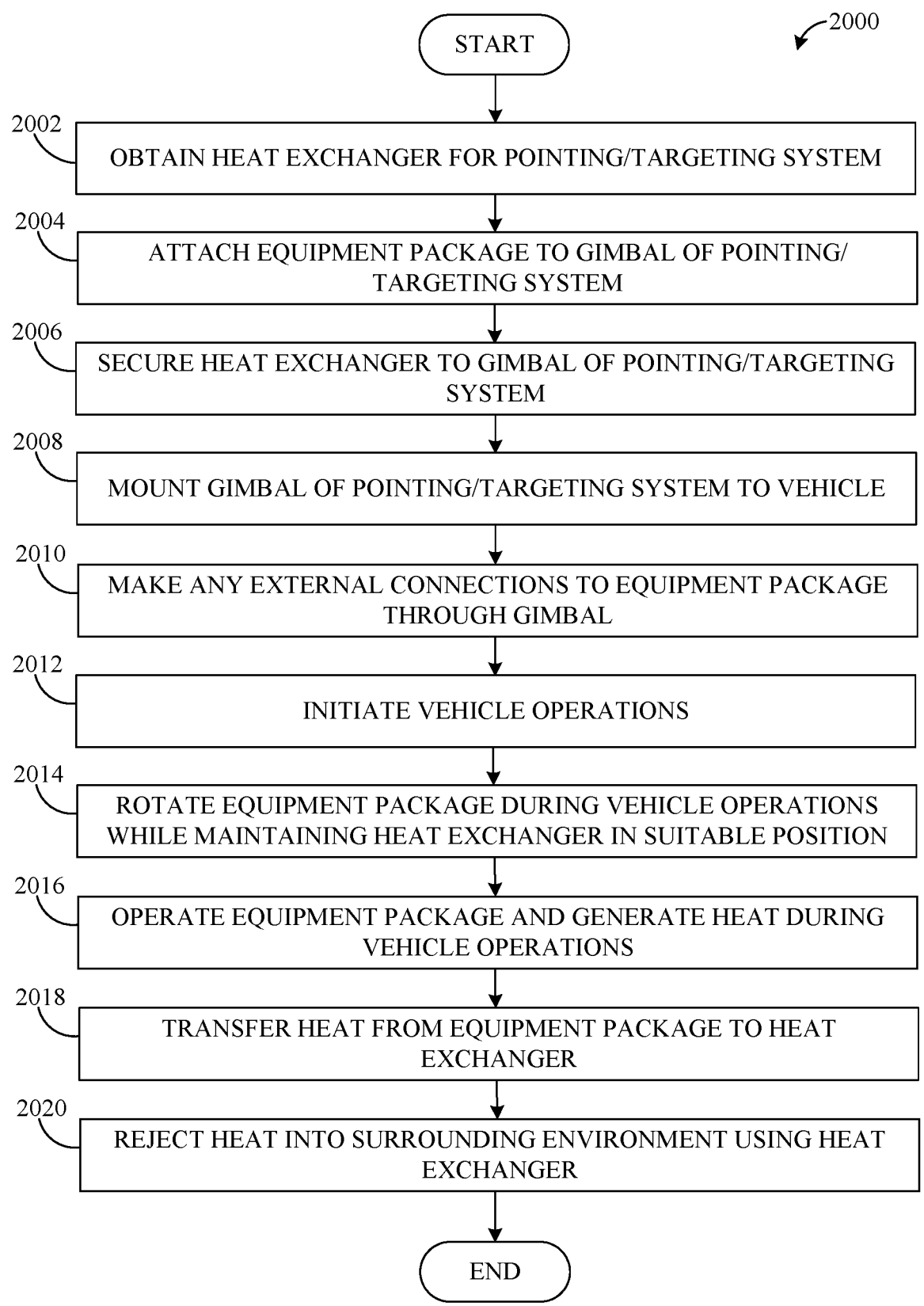
FIG. 20 illustrates an example method for using a heat exchanger with a multi-axis gimbal pointing or targeting system in accordance with this disclosure.

FIG. 20 illustrates an example method 2000 for using a heat exchanger with a multi-axis gimbal pointing or targeting system in accordance with this disclosure. For ease of explanation, the method 2000 is described as involving the use of the heat exchanger 100 or 1000 with the pointing or targeting system 600 or 1400, which can be used as the pointing or targeting system 1902 on the vehicle 1900. However, the method 2000 can be used with any other suitable heat exchanger, any other suitable pointing or targeting system, and any other suitable vehicle.

As shown in FIG. 20, a heat exchanger for a pointing or targeting system is obtained at step 2002. This can include, for example, manufacturing the heat exchanger 100 or 1000 or obtaining the heat exchanger 100 or 1000 from a supplier or other party. An equipment package is attached to a gimbal of the pointing or targeting system at step 2004. This can include, for example, placing the equipment package 604 or 1404 within the gimbal 602 or 1402 and securing the equipment package 604 or 1404 to the elevation covers 602c or 1402c of the gimbal 602 or 1402.

The heat exchanger is secured to the gimbal of the pointing or targeting system at step 2006. This can include, for example, securing the heat exchanger 100 to the azimuth yoke 602b or elevation covers 602c of the gimbal 602, possibly using one or more adapter brackets 614 and 616. This can alternatively include securing different portions 1002 and 1004 of the heat exchanger 1000 to the azimuth yoke 1402b or elevation covers 1402c of the gimbal 1402. This can further include connecting hoses 608 and 610 or 1406 from the equipment package 600 or 1400 to the heat exchanger 100 or 1000.

The gimbal of the pointing or targeting system is mounted to a vehicle at step 2008. This can include, for example, securing the base 602a or 1402a of the gimbal 600 or 1400 to the bottom, top, or other surface of the vehicle 1900. One or more external connections (if any) are made to the equipment package through the gimbal at step 2010. This can include, for example, coupling power or data communication lines to or from the equipment package 604 or 1404 through the gimbal 600 or 1400. In some embodiments, no external connections through the gimbal 600 or 1400 may be needed for cooling purposes. Note, however, that no external connections through the gimbal may be needed.

At this point, the pointing and targeting system can be used in any suitable manner. For example, vehicle operations can be initiated at step 2012. This can include, for example, launching or otherwise initiating use of the vehicle 1900. During the vehicle operations, the equipment package is rotated to various pointing angles with respect to the vehicle using the gimbal at step 2014. This can include, for example, rotating the equipment package 604 or 1404 about the azimuth axis and the elevation axis to point the equipment package 604 or 1404 in desired directions. During this time, the heat exchanger 100 or 1000 is maintained in a suitable position since the heat exchanger 100 or 1000 is positioned about the azimuth yoke 602b or 1402b of the gimbal 602 or 1402. Thus, the heat exchanger 100 or 1000 remains exposed to suitable airflow around or through the heat exchanger. The equipment package operates and generates heat during the vehicle operations at step 2016. This can include, for example, one or more internal electronic components, one or more power supplies, or other component(s) of the equipment package 604 or 1404 generating waste heat to be removed from the equipment package 604 or 1404.

At least some of the generated heat is transferred from the equipment package to the heat exchanger at step 2018. This can include, for example, pumping fluid that has absorbed the heat through a hose 608 or 1406 to the heat exchanger 100 or 1000. At least some of the heat is rejected from the heat exchanger into the surrounding environment at step 2020. This can include, for example, the heat exchanger 100 passing the fluid through the flow channels 106, which can reject the heat into air flowing past the flow channels 106. This can alternatively include the heat exchanger 1000 passing the fluid through the first and second portions 1002 and 1004 of the heat exchanger 1000, which can reject the heat into air flowing between the projections 1006 of the heat exchanger 1000. The fluid can then be returned to the equipment package, such as via a hose 610 or 1406, in order to absorb more heat. Note, however, that as described above, at least some of the fluid can bypass the heat exchanger 100 or 1000 during times when rejection of heat from the fluid is not needed. As a result, the rejection of heat from the heat exchanger 100 or 1000 does not necessarily represent a continuous operation.

Although FIG. 20 illustrates one example of a method 2000 for using a heat exchanger with a multi-axis gimbal pointing or targeting system, various changes may be made to FIG. 20. For example, while shown as a series of steps, various steps in FIG. 20 can overlap, occur in parallel, occur in a different order, or occur any number of times. As a particular example, the order of steps 2002-2010 can vary depending on how the overall system is being installed. As another particular example, steps 2012-2020 can overlap with one another during use of the heat exchanger 100 or 1000. Also, subsets of the steps shown in FIG. 20 can be performed by different entities, such as when one entity manufactures or supplies the heat exchanger 100 or 1000, another entity installs the heat exchanger 100 or 1000 with the pointing or targeting system 600 or 1400, and yet another entity uses the pointing or targeting system 600 or 1400 during vehicle operations.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
a heat exchanger configured to encircle and be mounted to an azimuth yoke rotatable on an azimuth axis of a multi-axis gimbal or to elevation covers that are used to rotate an equipment package on an elevation axis of the gimbal, the heat exchanger comprising:
an inlet configured to receive, from the gimbal, a fluid containing heat generated by the equipment package carried by the gimbal;
multiple heat rejection interfaces configured to reject the heat from the fluid into surrounding air in order to cool the fluid; and
an outlet configured to provide, into the gimbal, the cooled fluid from the heat exchanger;
wherein the heat rejection interfaces of the heat exchanger extend around the heat exchanger and are configured to reject the heat from the fluid regardless of a direction in which the gimbal is pointing the equipment package.

2. The apparatus of claim 1, wherein:
the heat rejection interfaces comprise multiple flow channels, the flow channels positioned around all or substantially all of the heat exchanger; and
the heat exchanger further comprises multiple fluid passages that fluidly couple the flow channels to enable the fluid to flow from the inlet to the outlet through the flow channels.

3. The apparatus of claim 2, wherein the heat exchanger further comprises:
top and bottom rings extending around the heat exchanger, the fluid passages positioned within the top and bottom rings; and
multiple stiffeners coupled to the top and bottom rings, the stiffeners configured to resist twisting or torsion of the heat exchanger.

4. The apparatus of claim 3, wherein the heat exchanger further comprises:
one or more intermediate plates positioned between the top and bottom rings, the one or more intermediate plates dividing the flow channels into segments, the one or more intermediate plates configured to provide structural reinforcement to the flow channels or the heat exchanger.

5. The apparatus of claim 3, wherein each stiffener is configured to be coupled to the gimbal.

6. The apparatus of claim 1, wherein:
the heat exchanger comprises first and second portions; and
the heat rejection interfaces comprise surfaces of the first and second portions, each surface having raised projections, the projections of the surfaces extending around all or substantially all of the heat exchanger.

7. The apparatus of claim 6, wherein the heat exchanger further comprises:
first and second hoses coupled to opposite sides of the first and second portions of the heat exchanger, the first and second hoses configured to provide the fluid from the first portion of the heat exchanger to the second portion of the heat exchanger; and
a third hose configured to provide the fluid from the second portion of the heat exchanger to the first portion of the heat exchanger.

8. The apparatus of claim 6, wherein the surfaces of the first and second portions are shorter in front and in back of the heat exchanger and taller on sides of the heat exchanger such that more projections are located on the sides of the heat exchanger than on the front and back of the heat exchanger.

9. The apparatus of claim 8, wherein the sides of the heat exchanger are configured to be coupled to the gimbal.

10. A system comprising:
a multi-axis gimbal comprising:
a base;

an azimuth yoke rotatably coupled to the base and configured to rotate with an equipment package about an azimuth axis; and elevation covers coupled to the azimuth yoke and configured to rotate the equipment package about an elevation axis; and a heat exchanger encircling and mounted on the azimuth yoke or the elevation covers of the gimbal, the heat exchanger comprising:

an inlet configured to receive, from the gimbal, a fluid containing heat generated by the equipment package;

multiple heat rejection interfaces configured to reject the heat from the fluid into surrounding air in order to cool the fluid; and an outlet configured to provide, into the gimbal, the cooled fluid from the heat exchanger;

wherein the heat rejection interfaces of the heat exchanger extend around the heat exchanger and are configured to reject the heat from the fluid regardless of a direction in which the gimbal is pointing the equipment package.

11. The system of claim 10, wherein:

the heat rejection interfaces comprise multiple flow channels, the flow channels positioned around all or substantially all of the heat exchanger; and the heat exchanger further comprises multiple fluid passages that fluidly couple the flow channels to enable the fluid to flow from the inlet to the outlet through the flow channels.

12. The system of claim 11, wherein the heat exchanger further comprises:

top and bottom rings extending around the heat exchanger, the fluid passages positioned within the top and bottom rings; and multiple stiffeners coupled to the top and bottom rings, the stiffeners configured to resist twisting or torsion of the heat exchanger.

13. The system of claim 12, wherein each stiffener is configured to be coupled to the azimuth yoke of the gimbal.

14. The system of claim 12, wherein the heat exchanger further comprises:

one or more intermediate plates positioned between the top and bottom rings, the one or more intermediate plates dividing the flow channels into segments, the one or more intermediate plates configured to provide structural reinforcement to the flow channels or the heat exchanger.

15. The system of claim 10, wherein:

the heat exchanger comprises first and second portions; and the heat rejection interfaces comprise surfaces of the first and second portions, each surface having raised projections, the projections of the surfaces extending around all or substantially all of the heat exchanger.

16. The system of claim 15, wherein the heat exchanger further comprises:

first and second hoses coupled to opposite sides of the first and second portions of the heat exchanger, the first and second hoses configured to provide the fluid from the first portion of the heat exchanger to the second portion of the heat exchanger; and a third hose configured to provide the fluid from the second portion of the heat exchanger to the first portion of the heat exchanger.

17. The system of claim 15, wherein the surfaces of the first and second portions are shorter in front and in back of the heat exchanger and taller on sides of the heat exchanger such that more projections are located on the sides of the heat exchanger than on the front and back of the heat exchanger.

18. The system of claim 17, wherein the sides of the heat exchanger are configured to be coupled to the elevation covers of the gimbal.

19. A method comprising:

positioning a heat exchanger to encircle a multi-axis gimbal;

mounting the heat exchanger to an azimuth yoke rotatable on an azimuth axis of the multi-axis gimbal or to elevation covers that are used to rotate an equipment package on an elevation axis of the gimbal;

coupling an inlet of the heat exchanger to receive, from the gimbal, a fluid containing heat generated by the equipment package carried by the gimbal; and coupling an outlet of the heat exchanger to provide, into the gimbal, the fluid from the heat exchanger;

wherein the heat exchanger comprises multiple heat rejection interfaces configured to reject the heat from the fluid into surrounding air in order to cool the fluid; and wherein the heat rejection interfaces of the heat exchanger extend around the heat exchanger and are configured to reject the heat from the fluid regardless of a direction in which the gimbal is pointing the equipment package.

20. The method of claim 19, wherein:

the heat exchanger further comprises top and bottom rings extending around the heat exchanger and multiple stiffeners coupled to the top and bottom rings; and coupling the heat exchanger to the multi-axis gimbal comprises coupling each stiffener to the azimuth yoke of the gimbal.

21. The method of claim 19, wherein:

the heat exchanger further comprises first and second portions; and coupling the heat exchanger to the multi-axis gimbal comprises coupling the first and second portions to the elevation covers of the gimbal.

* * * * *